US011587466B2

(12) United States Patent
Hofstetter et al.

(10) Patent No.: US 11,587,466 B2
(45) Date of Patent: *Feb. 21, 2023

(54) SIMULATED DISSECTIBLE TISSUE

(71) Applicant: Applied Medical Resources Corporation, Rancho Santa Margarita, CA (US)

(72) Inventors: Gregory K. Hofstetter, Rancho Santa Margarita, CA (US); Katie Black, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/002,033

(22) Filed: Aug. 25, 2020

(65) Prior Publication Data
US 2020/0388195 A1 Dec. 10, 2020

Related U.S. Application Data

(63) Continuation of application No. 16/431,118, filed on Jun. 4, 2019, now Pat. No. 10,755,602, which is a
(Continued)

(51) Int. Cl.
*G09B 23/30* (2006.01)
*G09B 23/34* (2006.01)

(52) U.S. Cl.
CPC ..................... *G09B 23/34* (2013.01)

(58) Field of Classification Search
CPC .............................. G09B 23/28; G09B 23/30
See application file for complete search history.

(56) References Cited

U.S. PATENT DOCUMENTS 184,573 A 11/1876 Becker
2,127,774 A 8/1938 Jacobs
(Continued)

FOREIGN PATENT DOCUMENTS

CA 2 293 585 A1 12/1998
CN 2421706 Y 2/2001
(Continued)

OTHER PUBLICATIONS

Society of Laparoendoscopic Surgeons, "Future Technology Session: The Edge of Innovation in Surgery, Space, and Business," http://www.laparoscopytoday.com/endourology/page/2/, Figure 1B: http://laparoscopy.blogs.com/laparoscopy_today/images/6-1/6-1VlaovicPicB.jpg , Sep. 5-8, 2007, 10 pgs.
(Continued)

*Primary Examiner* — Kurt Fernstrom
(74) *Attorney, Agent, or Firm* — Shirin Bozorgui; Patrick Ikehara

(57) ABSTRACT

A simulated tissue structure for surgical training is provided. The simulated tissue structure includes a first layer made of silicone and a second layer made of silicone interconnected by a third layer made of polyester fiber that is embedded in part in the first layer and in part in the second layer to create a mechanical linkage between the first layer and the second layer. Part of the third layer that is adjacent to the first layer and part of the third layer that is adjacent to the second layer includes fiber strands coated in silicone. An inclusion that mimics an anatomical structure is located between the first layer and the second layer. The third layer of polyester fibers provides a realistic dissection plane for the practice of the surgical excision of the inclusion.

20 Claims, 12 Drawing Sheets

Related U.S. Application Data continuation of application No. 15/209,565, filed on Jul. 13, 2016, now Pat. No. 10,332,425, which is a continuation of application No. PCT/US2016/041852, filed on Jul. 12, 2016.

(60) Provisional application No. 62/257,847, filed on Nov. 20, 2015, provisional application No. 62/193,143, filed on Jul. 16, 2015.

(56) References Cited

U.S. PATENT DOCUMENTS

| | | |
|---|---|---|
| 2,284,888 A | 6/1942 | Arneil, Jr. |
| 2,324,702 A | 7/1943 | Hoffman et al. |
| 2,345,489 A | 3/1944 | Lord |
| 2,495,568 A | 1/1950 | Coel |
| 3,766,666 A | 10/1973 | Stroop |
| 3,775,865 A | 12/1973 | Rowan |
| 3,789,518 A | 2/1974 | Chase |
| 3,921,311 A | 11/1975 | Beasley et al. |
| 3,991,490 A | 11/1976 | Markman |
| 4,001,951 A | 1/1977 | Fasse |
| 4,001,952 A | 1/1977 | Kleppinger |
| 4,321,047 A | 3/1982 | Landis |
| 4,323,350 A | 4/1982 | Bowden, Jr. |
| 4,332,569 A | 6/1982 | Burbank |
| 4,371,345 A | 2/1983 | Palmer et al. |
| 4,386,917 A | 6/1983 | Forrest |
| 4,459,113 A | 7/1984 | Boscaro Gatti et al. |
| 4,481,001 A | 11/1984 | Graham et al. |
| 4,596,528 A | 6/1986 | Lewis et al. |
| 4,726,772 A | 2/1988 | Amplatz |
| 4,737,109 A | 4/1988 | Abramson |
| 4,789,340 A | 12/1988 | Zikria |
| 4,832,978 A | 5/1989 | Lesser |
| 4,867,686 A | 9/1989 | Goldstein |
| 4,907,973 A | 3/1990 | Hon |
| 4,938,696 A | 7/1990 | Foster et al. |
| 4,940,412 A | 7/1990 | Blumenthal |
| 5,061,187 A | 10/1991 | Jerath |
| 5,083,962 A | 1/1992 | Pracas |
| 5,104,328 A | 4/1992 | Lounsbury |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,310,348 A | 5/1994 | Miller |
| 5,318,448 A | 6/1994 | Garito et al. |
| 5,320,537 A | 6/1994 | Watson |
| 5,358,408 A | 10/1994 | Medina |
| 5,368,487 A | 11/1994 | Medina |
| 5,380,207 A | 1/1995 | Siepser |
| 5,403,191 A | 4/1995 | Tuason |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,520,633 A | 5/1996 | Costin |
| 5,541,304 A | 7/1996 | Thompson |
| 5,620,326 A | 4/1997 | Younker |
| 5,720,742 A | 2/1998 | Zacharias |
| 5,722,836 A | 3/1998 | Younker |
| 5,727,948 A | 3/1998 | Jordan |
| 5,743,730 A | 4/1998 | Clester et al. |
| 5,762,458 A | 6/1998 | Wang et al. |
| 5,769,640 A | 6/1998 | Jacobus et al. |
| 5,775,916 A | 7/1998 | Cooper et al. |
| 5,785,531 A | 7/1998 | Leung |
| 5,800,178 A | 9/1998 | Gillio |
| 5,803,746 A | 9/1998 | Barrie et al. |
| 5,807,378 A | 9/1998 | Jensen et al. |
| 5,810,880 A | 9/1998 | Jensen et al. |
| 5,814,038 A | 9/1998 | Jensen et al. |
| 5,850,033 A | 12/1998 | Mirzeabasov et al. |
| 5,855,583 A | 1/1999 | Wang et al. |
| 5,873,732 A | 2/1999 | Hasson |
| 5,873,863 A | 2/1999 | Komlosi |
| 5,908,302 A | 6/1999 | Goldfarb |
| 5,947,743 A | 9/1999 | Hasson |
| 5,951,301 A | 9/1999 | Younker |
| 6,080,181 A | 6/2000 | Jensen et al. |
| 6,083,008 A | 7/2000 | Yamada et al. |
| 6,113,395 A | 9/2000 | Hon |
| 6,234,804 B1 | 5/2001 | Yong |
| 6,271,278 B1 | 8/2001 | Park et al. |
| 6,336,812 B1 | 1/2002 | Cooper et al. |
| 6,398,557 B1 | 6/2002 | Hoballah |
| 6,413,264 B1 | 7/2002 | Jensen et al. |
| 6,474,993 B1 | 11/2002 | Grund et al. |
| 6,485,308 B1 | 11/2002 | Goldstein |
| 6,488,507 B1 | 12/2002 | Stoloff et al. |
| 6,497,902 B1 | 12/2002 | Ma |
| 6,511,325 B1 | 1/2003 | Lalka et al. |
| 6,517,354 B1 | 2/2003 | Levy |
| 6,568,941 B1 | 5/2003 | Goldstein |
| 6,589,057 B1 | 7/2003 | Keenan et al. |
| 6,620,174 B2 | 9/2003 | Jensen et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,817,973 B2 | 11/2004 | Merril et al. |
| 6,820,025 B2 | 11/2004 | Bachmann et al. |
| 6,854,976 B1 | 2/2005 | Suhr |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,950,025 B1 | 9/2005 | Nguyen |
| 6,960,617 B2 | 11/2005 | Omidian et al. |
| 6,997,719 B2 | 2/2006 | Wellman et al. |
| 7,008,232 B2 | 3/2006 | Brassel |
| 7,018,327 B1 | 3/2006 | Conti |
| 7,025,064 B2 | 4/2006 | Wang et al. |
| 7,056,123 B2 | 6/2006 | Gregorio et al. |
| 7,080,984 B1 | 7/2006 | Cohen |
| 7,118,582 B1 | 10/2006 | Wang et al. |
| 7,255,565 B2 | 8/2007 | Keegan |
| 7,269,532 B2 | 9/2007 | David et al. |
| 7,272,766 B2 | 9/2007 | Sakezles |
| 7,300,450 B2 | 11/2007 | Vleugels et al. |
| 7,364,582 B2 | 4/2008 | Lee |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,431,189 B2 | 10/2008 | Shelton, IV et al. |
| 7,441,684 B2 | 10/2008 | Shelton, IV et al. |
| 7,465,168 B2 | 12/2008 | Allen et al. |
| 7,467,075 B2 | 12/2008 | Humphries et al. |
| 7,544,062 B1 | 6/2009 | Hauschild et al. |
| 7,549,866 B2 | 6/2009 | Cohen et al. |
| 7,553,159 B1 | 6/2009 | Arnal et al. |
| 7,575,434 B2 | 8/2009 | Palakodeti |
| 7,594,815 B2 | 9/2009 | Toly |
| 7,621,749 B2 | 11/2009 | Munday |
| 7,646,901 B2 | 1/2010 | Murphy et al. |
| 7,648,367 B1 | 1/2010 | Makower et al. |
| 7,648,513 B2 | 1/2010 | Green et al. |
| 7,651,332 B2 | 1/2010 | Dupuis et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 | 12/2010 | Toly |
| 7,850,456 B2 | 12/2010 | Chosack et al. |

(56) References Cited

U.S. PATENT DOCUMENTS

| | | |
|---|---|---|
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,017,107 B2 | 9/2011 | Thomas et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,465,771 B2 | 6/2013 | Wan et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,096,744 B2 | 8/2015 | Wan et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,387,276 B2 | 7/2016 | Sun et al. |
| 9,427,496 B2 | 8/2016 | Sun et al. |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0012746 A1 | 7/2004 | Toly |
| 2004/0248072 A1 | 12/2004 | Gray et al. |
| 2005/0008997 A1 | 1/2005 | Herman |
| 2005/0026125 A1 | 2/2005 | Toly |
| 2005/0064378 A1 | 3/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyama |
| 2005/0214727 A1 | 9/2005 | Stoianovici et al. |
| 2006/0046235 A1 | 3/2006 | Alexander et al. |
| 2006/0232664 A1 | 10/2006 | Toly |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |
| 2007/0238081 A1 | 10/2007 | Koh |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2008/0317818 A1 | 12/2008 | Griffith et al. |

(56) References Cited

U.S. PATENT DOCUMENTS

| | | |
|---|---|---|
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2009/0314550 A1 | 12/2009 | Layton |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0248200 A1 | 9/2010 | Ladak |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0285094 A1 | 11/2010 | Gupta |
| 2010/0324541 A1 | 12/2010 | Whitman |
| 2011/0020779 A1 | 1/2011 | Hannaford et al. |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Okano et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0276511 A1* | 11/2012 | Parry .......... G09B 23/30 434/270 |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0187855 A1 | 7/2014 | Nagale et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |

(56) References Cited

U.S. PATENT DOCUMENTS

| | | |
|---|---|---|
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0058534 A1 | 3/2016 | Derwin et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0125762 A1 | 5/2016 | Becker et al. |
| 2016/0133158 A1 | 5/2016 | Sui et al. |
| 2016/0140876 A1 | 5/2016 | Jabbour et al. |
| 2016/0194378 A1 | 7/2016 | Cass et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |
| 2017/0186340 A1* | 6/2017 | Ogawa ................ B32B 5/32 |

FOREIGN PATENT DOCUMENTS

| | | |
|---|---|---|
| CN | 2751372 Y | 1/2006 |
| CN | 2909427 Y | 6/2007 |
| CN | 101313842 A | 12/2008 |
| CN | 101528780 A | 9/2009 |
| CN | 201364679 Y | 12/2009 |
| CN | 201955979 U | 8/2011 |
| CN | 102458496 A | 5/2012 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 102596275 B | 6/2014 |
| CN | 103845757 A | 6/2014 |
| CN | 103886797 A | 6/2014 |
| CN | 103396562 B | 7/2015 |
| CN | 105194740 A | 12/2015 |
| CN | 105504166 A | 4/2016 |
| DE | 9102218 U1 | 5/1991 |
| DE | 41 05 892 A1 | 8/1992 |
| DE | 93 20 422 U1 | 6/1994 |
| DE | 44 14 832 A1 | 11/1995 |
| DE | 19716341 A1 | 9/2000 |
| EP | 1 024 173 A1 | 8/2000 |
| EP | 1 609 431 A1 | 12/2005 |
| EP | 2 068 295 A2 | 6/2009 |
| EP | 2 218 570 A1 | 8/2010 |
| FR | 2 691 826 A1 | 12/1993 |
| FR | 2 917 876 A1 | 12/2008 |
| GB | 2488994 A | 9/2012 |
| JP | 10 211160 A | 8/1998 |
| JP | 2001005378 A | 1/2001 |
| JP | 2006187566 A | 7/2006 |
| JP | 2009063787 A | 3/2009 |
| JP | 2009236963 A | 10/2009 |
| JP | 3162161 U | 8/2010 |
| JP | 2011113056 A | 6/2011 |
| JP | 2013127496 A | 6/2013 |
| KR | 101231565 B1 | 2/2013 |
| MX | PA 02004422 A | 11/2003 |
| PT | 106230 | 9/2013 |
| WO | WO 1994/06109 A1 | 3/1994 |
| WO | WO 1996/042076 A1 | 12/1996 |
| WO | WO 1998/58358 A1 | 12/1998 |
| WO | WO 1999/01074 A1 | 1/1999 |
| WO | WO 2000/36577 A1 | 6/2000 |
| WO | WO 2002/38039 A2 | 5/2002 |
| WO | WO 2002/038039 A3 | 5/2002 |
| WO | WO 2004/032095 A1 | 4/2004 |
| WO | WO 2004/082486 A1 | 9/2004 |
| WO | WO 2005/071639 A1 | 8/2005 |
| WO | WO 2005/083653 A1 | 9/2005 |
| WO | WO 2006/083963 A2 | 8/2006 |
| WO | WO 2007/068360 A1 | 6/2007 |
| WO | WO 2008/021720 A2 | 2/2008 |
| WO | WO 2008/103383 A1 | 8/2008 |
| WO | WO 2009/000939 A1 | 12/2008 |
| WO | WO 2009/089614 A1 | 7/2009 |
| WO | WO 2010/094730 A1 | 8/2010 |
| WO | WO 2011/035410 A1 | 3/2011 |
| WO | WO 2011/046606 A1 | 4/2011 |
| WO | WO 2011/127379 A2 | 10/2011 |
| WO | WO 2011/151304 A1 | 12/2011 |
| WO | WO 2012/149606 A1 | 11/2012 |
| WO | WO 2012/168287 A1 | 12/2012 |
| WO | WO 2012/175993 A1 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2014/197793 A1 | 12/2014 |
| WO | WO 2015/148817 A1 | 10/2015 |
| WO | WO 2016/138528 A1 | 9/2016 |
| WO | WO 2016/183412 A1 | 11/2016 |
| WO | WO 2016/198238 A1 | 12/2016 |
| WO | WO 2016/201085 A1 | 12/2016 |
| WO | WO 2017/031214 A1 | 2/2017 |
| WO | WO 2017/042301 A1 | 3/2017 |

OTHER PUBLICATIONS

European Patent Office, International Search Report for International Application No. PCT/US2011/053859 A3, dated Apr. 5, 2012, entitled "Portable Laparoscopic Trainer," 8 pgs.

European Patent Office, The International Search Report and Written Opinion for International Application No. PCT/US2012/60997, entitled "Simulated Tissue Structure for Surgical Training," dated Mar. 7, 2013, 8 pgs.

European Patent Office, The International Search Report and Written Opinion for International Application No. PCT/US2012/070971, entitled "Advanced Surgical Simulation," dated Mar. 18, 2013, 10 pgs.

Human Patient Simulator, Medical Education Technologies, Inc., http://www.meti.com (1999) all, printed Apr. 12, 2013, 24 pgs.

The International Bureau of WIPO, International Preliminary Report on Patentability and Written Opinion for International Application No. PCT/US2011/053859, entitled "Portable Laparoscopic Trainer," dated Apr. 2, 2013, 9 pgs.

European Patent Office, The International Search Report and Written Opinion for International Application No. PCT/US2013/062363, entitled "Surgical Training Model for Laparoscopic Procedures," dated Jan. 22, 2014, 11 pgs.

European Patent Office, The International Search Report and Written Opinion for International Application No. PCT/US2013/061949, entitled "Surgical Training Model for Laparoscopic Procedures," dated Feb. 17, 2014, 7 pgs.

Anonymous: Realsim Systems—LTS2000, Sep. 4, 2005, pp. 1-2, XP055096193, Retrieved from the Internet: URL:https://web.archive.

(56) References Cited

OTHER PUBLICATIONS org/web/2005090403;3030/http://www.realsimsystems.com/exersizes.htm (retrieved on Jan. 14, 2014).
European Patent Office, The International Search Report and Written Opinion for International Application No. PCT/US2013/062269, entitled "Surgical Training Model for Transluminal Procedures," dated Feb. 17, 2014, 8 pgs.
European Patent Office, The International Search Report and Written Opinion for International Application No. PCT/US2013/061557, entitled "Surgical Training Model for Laparoscopic Procedures," dated Feb. 10, 2014, 9 pgs.
European Patent Office, The International Search Report and Written Opinion for International Application No. PCT/US2013/061728, entitled "Surgical Training Model for Laparoscopic Procedures," dated Oct. 18, 2013, 9 pgs.
Limps and Things, EP Guildford MATTU Hernia Trainer, http://limbsandthings.com/us/products/tep-guildford-mattu-hernia-trainer/, printed May 29, 2014, 11 pgs.
Simulab, Hernia Model, http://www.simulab.com/product/surgery/open/hernia model, printed printed May 29, 2014, 4 pgs.
McGill Laparoscopic Inguinal Hernia Simulator, Novel Low-Cost Simulator for Laparoscopic Inguinal Hernia Repair, Feb. 8, 2011, 1 pg.
University of Wisconsin-Madison Biomedical Engineering, Inguinal Hernia Model, http://bmedesiqn.engr.wisc.edu/proiects/s10/hernia_model/, printed May 29, 2014, 62 pgs.
The International Bureau of WIPO, International Preliminary Report on Patentability for International Application No. PCT/US2012/070971, entitled "Advanced Surgical Simulation," dated Jun. 24, 2014, 7 pgs.
European Patent Office, The International Search Report and Written Opinion of the International Searching Authority for International Application No. PCT/US2014/038195, entitled "Hernia Model", dated Oct. 15, 2014, 20 pgs.
European Patent Office, The International Search Report and Written Opinion of the International Searching Authority for International Application No. PCT/US2014/048027, entitled "First Entry Model", dated Oct. 17, 2014, 10 pgs.
The International Bureau of WIPO, International Preliminary Report on Patentability for International Application No. PCT/US2012/060997, entitled "Simulated Tissue Structure For Surgical Training" dated Apr. 22, 2014, 6 pgs.
European Patent Office, The International Search Report and Written Opinion for International Application No. PCT/US2014/019840, entitled "Advanced Surgical Simulation Constructions and Methods," dated Jul. 4, 2014, 8 pgs.
Kurashima, et al., "A tool for training and evaluation of Laparoscopic inguinal hernia repair; the Global Operative Assessment of Laparoscopic Skills—Groin Hernia" American Journal of Surgery, Paul Hoeber, New York, NY, US vol. 201, No. 1, Jan. 1, 2011, pp. 54-61 XP027558745.
European Patent Office, The International Search Report and Written Opinion for International Application No. PCT/US2014/042998, entitled "Gallbladder Model," dated Jan. 7, 2015, 20 pgs.
The International Bureau of WIPO, International Preliminary Report on Patentability, for PCT application No. PCT/US2013/053497, entitled Simulated Stapling and Energy Based Ligation for Surgical Training, dated Feb. 12, 2015, 6 pgs.
The International Bureau of WIPO, International Preliminary Report on Patentability for International Application No. PCT/US2013/062363, entitled "Surgical Training Model for Laparoscopic Procedures," dated Apr. 9, 2015, 9 pgs.
The International Bureau of WIPO, International Preliminary Report on Patentability for International Application No. PCT/US2013/062269, entitled "Surgical Training Model for Laparoscopic Procedures," dated Apr. 9, 2015, 6 pgs.
The International Bureau of WIPO, International Preliminary Report on Patentability for International Application No. PCT/US2013/061557, entitled "Surgical Training Model for Laparoscopic Procedures," dated Apr. 9, 2015, 6 pgs.

The International Bureau of WIPO, International Preliminary Report on Patentability for International Application No. PCT/US2013/061728, entitled "Surgical Training Model for Laparoscopic Procedures," dated Apr. 9, 2015, 7 pgs.
The International Bureau of WIPO, International Preliminary Report on Patentability for International Application No. PCT/US2013/061949, entitled "Surgical Training Model for Laparoscopic Procedures," dated Apr. 9, 2015, 6 pgs.
The International Bureau of WIPO, International Preliminary Report on Patentability for International Application No. PCT/US2014/019840, entitled "Simulated Tissue Structure For Surgical Training," dated Sep. 11, 2015, 8 pgs.
European Patent Office, The International Search Report and Written Opinion for International Application No. PCT/US2015/020574, entitled "Advanced First Entry Model for Surgical Simulation," dated Jun. 1, 2015, 12 pgs.
European Patent Office, The International Search Report and Written Opinion for International Application No. PCT/US2015/022774, entitled "Simulated Dissectible Tissue," dated Jun. 11, 2015, 13 pgs.
Anonymous: Silicone rubber—from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/038195, entitled "Hernia Model," dated Nov. 26, 2015, 16 pgs.
The International Bureau of WIPO, International Preliminary Report on Patentability for International Application No. PCT/US2014/042998, entitled "Gallbladder Model," dated Dec. 30, 2015, 15 pgs.
European Patent Office, International Search Report and Written Opinion for International Application No. PCT/US2013/053497, titled "Simulated Stapling and Energy Based Ligation for Surgical Training," dated Nov. 5, 2013, 8 pgs.
The International Bureau of WIPO, International Preliminary Report on Patentability for International Application No. PCT/US2014/048027, entitled "First Entry Model," dated Feb. 4, 2016, 8 pgs.
European Patent Office, International Search Report and Written Opinion for International Application No. PCT/US2015/059668, entitled "Simulated Tissue Models and Methods," dated Apr. 26, 2016, 20 pgs.
Australian Patent Office, Patent Examination Report No. 1 for Australian Application No. 2012358851, titled "Advanced Surgical Simulation," dated May 26, 2016, 3 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2016/032292, entitled "Synthetic Tissue Structures for Electrosurgical Training and Simulation," dated Jul. 14, 2016, 11 pgs.
European Patent Office, International Search Report and Written Opinion for International Application No. PCT/US2016/018697, entitled "Simulated Tissue Structures and Methods," dated Jul. 14, 2016, 21 pgs.
European Patent Office, International Search Report and Written Opinion for International Application No. PCT/US2016/034591, entitled "Surgical Training Model for Laparoscopic Procedures," dated Aug. 8, 2016, 18 pgs.
European Patent Office, The International Search Report and Written Opinion of the International Searching Authority for International Application No. PCT/US2016/036664, entitled "Hysterectomy Model", dated Aug. 19, 2016, 15 pgs.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for Interna-

(56) References Cited

OTHER PUBLICATIONS tional Application No. PCT/US2016/0043277 titled "Appendectomy Model", dated Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", dated Oct. 13, 2016, 12 pgs.
3D-MED Corporation, "Validated Training Course for Laparoscopic Skills," https://www.3-dmed.com/sites/default/files/product-additional/product-spec/Validated%20Traininq%20Course%20for%20Laparoscopic%20Skills.docx_3.pdf, Printed Aug. 23, 2016, pp. 1-6.
3D-MED Corporation, "Loops and Wire #1," https://www.3-dmed.com/product/loops-and-wire-1, printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
European Patent Office, Invitation to Pay Additional Fees for International Application No. PCT/US2016/062669, titled "Simulated Dissectible Tissue", dated Feb. 10, 2017, 8 pgs.
European Patent Office, The International Search Report and Written Opinion of the International Searching Authority for International Application No. PCT/US2016/055148 titled "Hysterectomy Model", dated Feb. 28, 2017, 12 pgs.
European Patent Office, Examination Report for European Application No. 14733949.3 titled "Gallbladder Model," dated Dec. 21, 2016, 6 pgs.
European Patent Office, The International Search Report and Written Opinion of the International Searching Authority for International Application No. PCT/US2016/062669 titled "Simulated Dissectible Tissue," dated Apr. 5, 2017, 19 pgs.
European Patent Office, The International Search Report and Written Opinion of the International Searching Authority for International Application No. PCT/US2017/020389 titled "Simulated Tissue Cartridge", dated May 24, 2017, 13 pgs.
The International Bureau of WIPO, International Preliminary Report on Patentability and Written Opinion for International Application No. PCT/US2015/059668, entitled "Simulated Tissue Models and Methods," dated May 26, 2017, 16 pgs.
The International Bureau of WIPO, International Preliminary Report on Patentability for International Application No. PCT/US2016/018697, entitled "Simulated Tissue Structures and Methods," dated Aug. 31, 2017, 14 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.
The International Bureau of WIPO, International Preliminary Report on Patentability for International Application No. PCT/US2016/036664, entitled "Hysterectomy Model," dated Dec. 21, 2017, 10 pgs.
The International Bureau of WIPO, International Preliminary Report on Patentability for International Application No. PCT/US2016/041852, entitled "Simulated Dissectible Tissue," dated Jan. 25, 2018, 12 pgs.
European Patent Office, Extended European Search Report for European Patent Application No. EP 17202365.7, titled "Gallbladder Model", dated Jan. 31, 2018, 8 pgs.
The International Bureau of WIPO, International Preliminary Report on Patentability for International Application No. PCT/US2016/043277, entitled "Appendectomy Model," dated Feb. 1, 2018, 9 pgs.

The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2017/039113, entitled "Simulated Abdominal Wall," dated Aug. 7, 2017, 13 pgs.
European Patent Office, The International Search Report and Written Opinion for International Application No. PCT/US2018/018895, entitled "Synthetic Tissue Structures for Electrosurgical Training and Simulation," dated May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.
European Patent Office, The International Search Report and Written Opinion for International Application No. PCT/US2018/018036, entitled "Laparoscopic Training System," dated Jun. 8, 2018, 13 pgs.
European Patent Office, Extended European Search Report for European Patent Application No. EP 18177751.7, titled "Portable Laparoscopic Trainer," dated Jul. 13, 2018, 8 pgs.
European Patent Office, The International Search Report and Written Opinion for International Application No. PCT/US2018/034705, entitled "Laparoscopic Training System," dated Aug. 20, 2018, 14 pgs.
The International Bureau of WIPO, International Preliminary Report on Patentability for International Application No. PCT/US2017/020389, entitled "Simulated Tissue Cartridge," dated Sep. 13, 2018, 8 pgs.
European Patent Office, Extended European Search Report for European Patent Application No. EP 18184147.9, titled "First Entry Model," dated Nov. 7, 2018, 7 pgs.
The International Bureau of WIPO, International Preliminary Report on Patentability for International Application No. PCT/US2017/039113, entitled "Simulated Abdominal Wall," dated Jan. 10, 2019, 8 pgs.
European Patent Office, Extended European Search Report for European Patent Application No. EP 18210006.5, titled "Surgical Training Model for Laparoscopic Procedures," dated Jan. 21, 2019, 7 pgs.
European Patent Office, Extended European Search Report for European Patent Application No. EP 18207214.0, titled "Synthetic Tissue Structures for Electrosurgical Training and Simulation," dated Mar. 28, 2019, 6 pgs.
European Patent Office, Extended European Search Report for European Patent Application No. EP 18216002.8, titled "Surgical Training Model for Laparoscopic Procedures," dated Apr. 2, 2019, 6 pgs.
European Patent Office, Extended European Search Report for European Patent Application No. EP 18216005.1, titled "Surgical Training Model for Laparoscopic Procedures," dated Apr. 2, 2019, 7 pgs.
European Patent Office, Extended European Search Report for European Patent Application No. EP 19159065.2, titled "Simulated Tissue Structures and Methods," dated May 29, 2019, 8 pgs.
The International Bureau of WIPO, International Preliminary Report on Patentability for International Application No. PCT/US2018/018036, entitled "Laparoscopic Training System," dated Aug. 29, 2019, 8 pgs.
The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.
European Patent Office, Extended European Search Report for European Patent Application No. 21159294.4, titled "Surgical Training Model for Laparoscopic Procedures," dated Apr. 5, 2021, 7 pgs.
European Patent Office, Extended European Search Report for European Patent Application No. EP 20186713.2, titled "Simulated Dissectible Tissue," dated Nov. 10, 2020, 12 pgs.

(56) References Cited

OTHER PUBLICATIONS

European Patent Office, Extended European Search Report for European Patent Application No. EP 20153338.7, titled "Advanced Surgical Simulation Constructions and Methods," dated Mar. 5, 2020, 7 pgs.

European Patent Office, Extended European Search Report for European Patent Application No. EP 19215545.5, titled "Advanced First Entry Model for Surgical Simulation," dated Mar. 26, 2020, 8 pgs.

European Patent Office, Extended European Search Report for European Patent Application No. EP 20158500.7, titled "Surgical Training Device," dated May 14, 2020, 9 pgs.

"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/ Surgical_Female_Pelvic_Trainer_SFPT_with_Advanced_Uterus_User_Guide.pdf, retrieved Feb. 21, 2020, 2 pgs.

Condino et al.; "How to build patient-specific synthetic abdominal anatomies. An innovative approach from physical toward hybrid surgical simulators," The International Journal of Medical Robotics and Computer Assisted Surgery, Apr. 27, 2011, vol. 7, No. 2, pp. 202-213.

Wilkes et al.; "Closed Incision Management with Negative Pressure Wound Therapy (CIM): Biomechanics," Surgical Innovation 19(1), URL:https://journals.sagepub.com/doi/pdf/10.1177/1553350611414920, Jan. 1, 2012, pp. 67-75.

European Patent Office, Extended European Search Report for European Patent Application No. EP 21182654.0, titled "Simulated Dissectible Tissue," dated Oct. 22, 2021, 13 pgs.

European Patent Office, Extended European Search Report for European Patent Application No. EP 21191452.8, titled "Advanced Surgical Simulation Constructions and Methods," dated Dec. 13, 2021, 8 pgs.

European Patent Office, Extended European Search Report for European Patent Application No. EP 22151452.4, titled "Portable Laparoscopic Trainer," dated Apr. 13, 2022, 8 pgs.

\* cited by examiner

SIMULATED DISSECTIBLE TISSUE

CROSS-REFERENCE TO RELATED APPLICATION

This patent application is a continuation application of U.S. application Ser. No. 16/431,118, entitled "Simulated dissectible tissue," filed Jun. 4, 2019, which is a continuation application of U.S. application Ser. No. 15/209,565, entitled "Simulated dissectible tissue," filed Jul. 13, 2016, which claims the benefit of and is a continuation of International Application Serial No. PCT/US16/41852 entitled "Simulated dissectible tissue" filed on Jul. 12, 2016 which claims priority to and benefit of U.S. Provisional Patent Application Ser. No. 62/193,143 entitled "Simulated dissectible tissue" filed on Jul. 16, 2015 and U.S. Provisional Patent Application Ser. No. 62/257,847 entitled "Simulated dissectible tissue" filed on Nov. 20, 2015 all of which are incorporated herein by reference in their entirety.

FIELD OF THE INVENTION

This application is generally related to surgical training tools, and in particular, to simulated tissue structures and models for teaching and practicing various surgical techniques and procedures related but not limited to laparoscopic, endoscopic and minimally invasive surgery.

BACKGROUND OF THE INVENTION

Medical students as well as experienced doctors learning new surgical techniques must undergo extensive training before they are qualified to perform surgery on human patients. The training must teach proper techniques employing various medical devices for cutting, penetrating, clamping, grasping, stapling, cauterizing and suturing a variety of tissue types. The range of possibilities that a trainee may encounter is great. For example, different organs and patient anatomies and diseases are presented. The thickness and consistency of the various tissue layers will also vary from one part of the body to the next and from one patient to another. Different procedures demand different skills. Furthermore, the trainee must practice techniques in various anatomical environs that are influenced by factors such as the size and condition of the patient, the adjacent anatomical landscape and the types of targeted tissues and whether they are readily accessible or relatively inaccessible.

Numerous teaching aids, trainers, simulators and model organs are available for one or more aspects of surgical training. However, there is a need for models or simulated tissue elements that are likely to be encountered in and that can be used for practicing endoscopic and laparoscopic, minimally invasive, transluminal surgical procedures. In laparoscopic surgery, a trocar or cannula is inserted to access a body cavity and to create a channel for the insertion of a camera such as a laparoscope. The camera provides a live video feed capturing images that are then displayed to the surgeon on one or more monitors. At least one additional small incision is made through which another trocar/cannula is inserted to create a pathway through which surgical instruments can be passed for performing procedures observed on the video monitor. The targeted tissue location such as the abdomen is typically enlarged by delivering carbon dioxide gas to insufflate the body cavity and create a working space large enough to accommodate the scope and instruments used by the surgeon. The insufflation pressure in the tissue cavity is maintained by using specialized trocars. Laparoscopic surgery offers a number of advantages when compared with an open procedure. These advantages include reduced pain, reduced blood and shorter recovery times due to smaller incisions.

Laparoscopic or endoscopic minimally invasive surgery requires an increased level of skill compared to open surgery because the target tissue is not directly observed by the clinician. The target tissue is observed on monitors displaying a portion of the surgical site that is accessed through a small opening. Therefore, clinicians need to practice visually determining tissue planes, three-dimensional depth perception on a two-dimensional viewing screen, hand-to-hand transfer of instruments, suturing, precision cutting and tissue and instrument manipulation. Typically, models simulating a particular anatomy or procedure are placed in a simulated pelvic trainer where the anatomical model is obscured from direct visualization by the practitioner. Ports in the trainer are employed for passing instruments to practice techniques on the anatomical model hidden from direct visualization. Simulated pelvic trainers provide a functional, inexpensive and practical means to train surgeons and residents the basic skills and typical techniques used in laparoscopic surgery such as grasping, manipulating, cutting, tying knots, suturing, stapling, cauterizing as well as how to perform specific surgical procedures that utilized these basic skills.

Organ models for use with simulated pelvic trainers on which surgeons can train surgical techniques are needed. These organ models need to be realistic so that the surgeon can properly learn the techniques and improve their skills. Currently, most simulated tissue structures are made of silicone. On the one hand, silicone is very elastic and when cut and silicone rebounds quickly. On the other hand, real tissue does not rebound fully when manipulated. Furthermore, silicone will tear fairly easily in the presence of a cut or a hole, but it resists tearing if there are no defects present. On the other hand, real tissue dissects easily. Also, adhering tissue surfaces poses further difficulties, such as excessive tackiness, when desiring a realistic interface. Therefore, challenges exist to making simulated tissue structures out of silicone that not only appear real, but also, function with the feel of real tissue when dissected and manipulated surgically. The present invention provides such a simulated tissue structure.

SUMMARY OF THE INVENTION

According to one aspect of the invention, a simulated tissue structure for surgical training is provided. The simulated tissue structure includes a first layer of silicone polymer having a configuration of a planar sheet with an upper surface and a lower surface defining a thickness therebetween. The simulated tissue structure includes a second layer of silicone polymer having a configuration of a planar sheet with an upper surface and lower surface defining a thickness therebetween. The second layer is spaced apart from the first layer such that the upper surface of the first layer faces the lower surface of the second layer. The simulated tissue structure includes a third layer made of a plurality of entangled fibers located between the first layer and the second layer. At least part of the plurality of entangled fiber filaments of the third layer are embedded in at least one of the first layer and second layer.

According to another aspect of the invention, a simulated tissue structure for surgical training is provided. The simulated tissue structure includes a first layer of silicone polymer with an upper surface and a lower surface. The simulated tissue structure includes a second layer of silicone polymer with an upper surface and lower surface. The second layer is spaced apart from the first layer such that the upper surface of the first layer faces the lower surface of the second layer. The simulated tissue structure further includes a third layer made of a plurality of entangled fiber filaments located between the first layer and the second layer. The third layer has an upper surface and a lower surface. At least part of the lower surface of the third layer is embedded in the upper surface of the first layer. The simulated tissue structure includes a fourth layer made of a plurality of entangled fiber filaments located between the first layer and the second layer. The fourth layer being embedded in the second layer at the lower surface of the second layer. The simulated tissue structure includes a first inclusion located between the third layer and the fourth layer.

According to another aspect of the invention, a simulated tissue structure for surgical training is provided. The simulated tissue structure includes a first tube defining a first lumen. The first tube has an inner layer, an outer layer and a middle layer. The outer layer is connected to the inner layer by the middle layer. The middle layer is made of a plurality of entangled fibers embedded in part in the inner layer and in part embedded in the outer layer. The simulated tissue structure further includes a second tube defining a second lumen. The second tube has an outer layer and an inner layer. The first tube is located inside the second lumen. The simulated tissue structure further includes an inclusion located between the inner layer of the second tube and the outer layer of the first tube.

According to another aspect of the invention, a simulated tissue structure for surgical training is provided. The simulated tissue structure includes a first layer made of silicone and a second layer made of silicone interconnected by a third layer made of polyester fiber that is embedded in part in the first layer and in part in the second layer to create a mechanical linkage between the first layer and the second layer. Part of the third layer that is adjacent to the first layer and part of the third layer that is adjacent to the second layer includes fiber strands coated in silicone. An inclusion that mimics an anatomical structure is located between the first layer and the second layer. The third layer of polyester fibers provides a realistic dissection plane for the practice of the surgical excision of the inclusion.

DETAILED DESCRIPTION OF THE INVENTION

Figure 1:
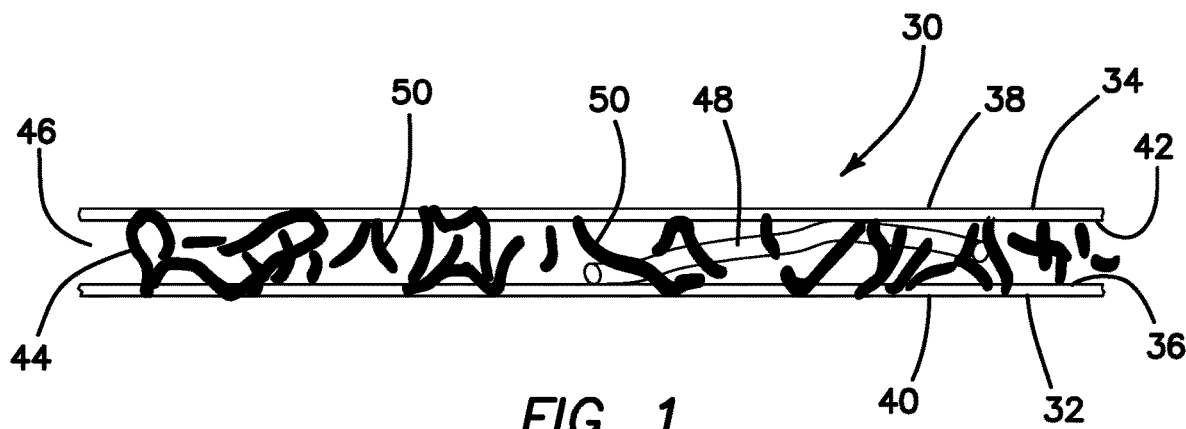
FIG. 1 is a side elevational cross-section of a simulated tissue structure according to the present invention.

A simulated tissue structure 30 according to the present invention is shown in FIG. 1. The structure 30 includes a first layer 32 and a second layer 34 having an upper surface 36, 38 and lower surface 40, 42, respectively. The first layer 32 and the second layer 34 are interconnected by a third layer 44 defining a gap 46 therebetween. The simulated tissue structure 30 may further optionally include inclusions 48 located between the first and second layers 32, 34. The inclusions 48 include simulated vessels, veins, tumors, ducts, vasculature, nerves, fat deposits, pathologies or other anatomical structures. The inclusions 48 are typically made of silicone but may also be made of other polymers or other suitable material and realistically shaped, colored and configured.

The third layer 44 comprises a plurality of one or more non-aligned, randomly arranged, nonwoven fiber 50 connected to the first layer 32 and/or second layer 34 at one or more location along the length of the fiber(s) 50. The fiber 50 is connected to one or more of the first layer 32 and the second layer 34 by being embedded into the one or more of the first layer 32 and the second layer 34 during the manufacturing process which will be described in greater detail below. Each fiber may be in the form of a strand, filament, yarn, micro-fiber and the like and has a length and a first free end and a second free end. Adhesive is not used to connect the fiber. The fiber of the third layer 44 is resident within the gap 46 in a randomly arranged fashion. One strand of fiber 50 may be connected to the first layer 32 at one location and then connected to the first layer 32 again at another location along the length of the fiber or to the second layer 34 and its free ends may or may not be embedded in the first or second layer. Some strands of fiber 50 may not be connected to the first layer 32 or second layer 34 and are freely disposed between the first layer 32 and the second layer 34. Some strands of fiber 50 are entangled and intertwined with other strands in a loose fashion such that the strands may move relative to other strands. The fiber may span the gap 46 to be connected to the opposite or second layer 34 at one or more location along the length of the fiber. It is possible to use a single fiber strand instead of a plurality of fiber strands to comprise the third layer 44. The single fiber strand would be longer in length to fill and create a gap 46 between the layers 32, 34 compared to the use of shorter strands to fill the same gap. The fibers are selected from any suitable material such as polyester, polyamide, acrylic, acetate, polyolefin, cotton, fiberfill, batting, polyethylene terephthalate, polyethylene naphthalate, nylon, polyfill, fiberfill, polymer, plastic, spandex or other suitable fiber, natural fiber, non-absorbent fiber, synthetic fiber or fiber-like material. The material may be woven, not woven or partially woven. Fiberfill is typically made by garnetting in which a garnet machine takes fibers and combs them into a batt form. The garnet machine may then fold and chop the fibers to make strands that are shorter and clumped together. The fibers mat together entangle and bunch.

One or more of the first layer 32 and second layer 34 has a substantially uniform thickness between its upper surface 36, 38 and its lower surface 40, 42 defining a substantially planar configuration. In one variation, the first layer 32 and the second layer 34 have a substantially uniform thickness between its upper surface 36, 38 and its lower surface 40, 42. The lower surface 42 of the second layer 34 faces the upper surface 36 of the first layer 32. In the location where the fibers 50 are attached to one of the first layer 32 and second layer 34, the layer 32, 34 has a reduced thickness because part of the thickness is taken by the thickness of the fiber itself. The first and second layers 32, 34 are made of any suitable elastomeric material such as silicone. Room temperature vulcanization silicone is used in one variation. In one variation, the second layer 34 is avoided and the simulated tissue structure 30 includes only the first layer 32 and the third layer 44 of fiber connected to the first layer 32.

Figure 2C:
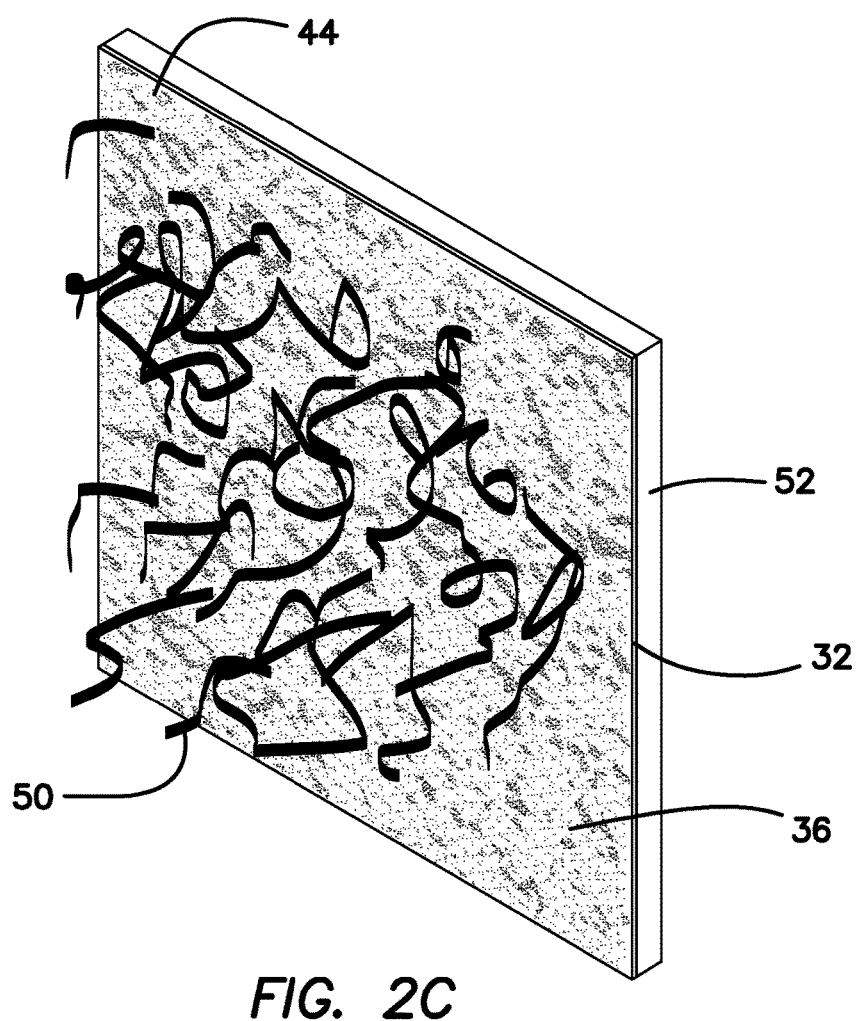
FIG. 2C is a top perspective view of a casting dish, first layer of silicone and fiber layer according to the present invention.
Figure 2A:
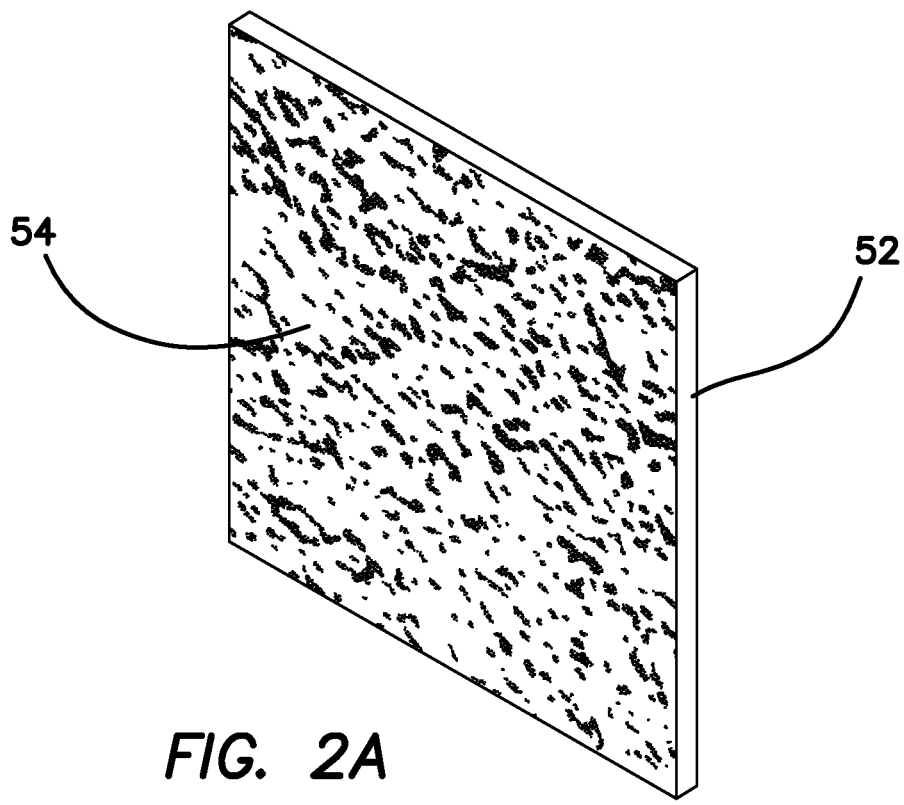
FIG. 2A is top perspective view of a casting dish according to the present invention.
Figure 2B:
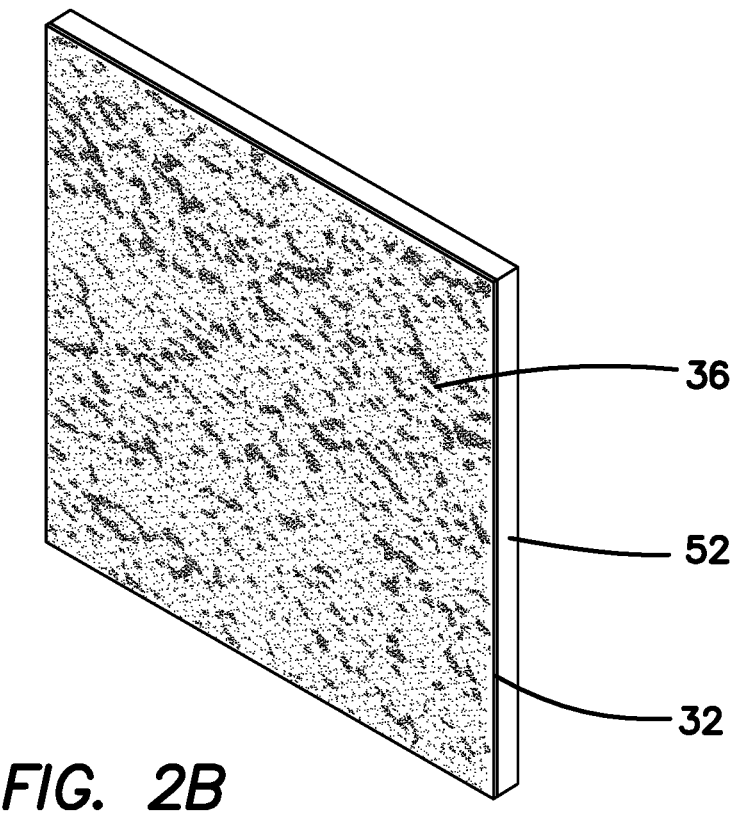
FIG. 2B is a top perspective view of a casting dish and a first layer of silicone according to the present invention.

The method of manufacturing the simulated tissue structure 30 will now be described with reference to FIGS. 2A-2C. A casting dish 52 having a textured surface 54 is provided. In another variation, the casting dish 52 has a smooth surface. Uncured room temperature vulcanization silicone is provided and applied evenly onto the textured surface 54 of the casting dish 52 as shown in FIG. 2B to form a thin first layer 32. A spatula may be used to calendar the silicone evenly into a thin first layer 32. While the silicone of the first layer 32 is in an uncured state, the third layer 44 is applied. In particular, a layer of polyester fibers 50 is placed onto the upper surface 36 of the first layer 32 while the first layer 32 is still wet. The polyester fibers 50 are arranged in a desired shape, thickness and density. The fibers 50 are then tamped down into the first layer 32 to help embed the fibers into the first layer 32 in a random fashion. Some parts of the fibers 50 are embedded in the silicone and most are exposed to the air and remain available to embed in a subsequent silicone casting.

Any optional inclusions 48 are placed onto or in juxtaposition with the upper surface 36 of the first layer 32. The inclusions 48 are placed before the polyester fibers 50 are applied. In another variation, the inclusions 48 are placed after the polyester fibers 50 are applied. If the inclusions 48 are placed before the polyester fibers 50, the inclusions 48 will become adhered to the first layer 32 as the silicone cures. If the inclusions 48 are placed after the polyester fibers 50, only portions of the inclusions 48 that are in direct contact with the wet silicone of the first layer 32 will become adhered to the first layer 32 as the silicone cures. Thereby, the inclusions may be selectively adhered to either the first layer and/or the second layer to provide a realistic scenario for practicing the removal of an inclusion in a simulated surgical excision of the inclusion 48 with the surgeon employing careful and selective dissection. Also, only portions of the fibers 50 that are in contact with the wet silicone of the first layer 32 will become adhered to the first layer 32. The silicone of the first layer 32 is allowed to cure fully embedding parts of the fibers into the first layer 32. In one variation, the inclusions 48 are placed onto the first layer 32 after the first layer 32 has cured, thereby, not being embedded therein. Similarly, the fiber third layer 44 is placed onto a cured first layer 32 and, thereby, not becoming bonded thereto.

After the first layer 32 is cured, the textured first layer 32 is removed from the casting dish 52. Typically, very thin sheets of silicone are difficult to remove from a casting dish 52 even with a layer of mold release coating the casting dish. However, the presence of fibers 50 that are attached to the first layer 32 upon curing of the silicone enable extremely thin layers of silicone to be removed from a casting dish without resulting in the layer tearing or being damaged. The interconnected embedded fibers 50 help to gently pull the thin layer away from the casting dish. Hence, the fiber layer 44 makes the tissue structure 30 more resilient to tearing and advantageously enables extremely thin layers of silicone to be casted and safely removed without tearing from the casting dish. The textured casting dish 52 advantageously provides locations of reduced thickness as wet silicone will pool in the locations where the casting dish is deeper. In one variation, the texture of casting dish 52 creates a multitude of small holes throughout the layer. The holes are relatively unrecognizable because advantageously the fiber layer provides a visual of glistening tissue as light is reflected in many directions from the shiny fiber mimicking wet live tissue. Furthermore, the holes act as points of origin for tears in the first layer 32 of silicone which is advantageous for simulating dissection, because, as mentioned previously, defects in the silicone help overcome the large and often unrealistic resistance to tearing of silicone. However, as the first layer 32 of silicone is made thinner, it become more difficult to de-mold and remove. The added fibers 50, which are placed on top of the uncured silicone while in the casting dish 52, form a composite with the silicone and make it possible to de-mold extremely thin sheets. Furthermore, advantageously, the presence of fibers 50 atop and in connection with the first layer 32 while the silicone of the first layer 32 is still uncured creates a capillary action or absorbency depending upon the type of material used in making the fiber that pulls silicone into the fibers 50 and away from the casting dish 52. This capillary action results in extremely thin spots and even small holes in the casting of the first and second layers 32, 34 which are easy and realistic to dissect using surgical instruments. This capillary action allows for the formation of sheets on un-textured, smooth casting dishes with the same desirable end results wherein the layers 32, 34 have locations of reduced thickness of silicone. The isolated spots of reduced thickness in the silicone layer 32, 34 act as points of origin for tears that mimic real dissection with a scalpel. The capillary-like action takes place when the fibers 50 are placed on the silicone when it is in an uncured state and results in at least part of the fiber strand becoming coated with the polymer or silicone polymer. The silicone bonds well to the micro-fibers and advantageously reduces friction when the fibers are moved against each other creating a slick, almost wet-like interface. In one variation, all of the fibers are coated before being embedded in one or more of the first and second layers. The fibers 50 of the third layer 44 are not ordered or aligned but randomly tangled. This tangled configuration resist the silicone's natural rebound, greatly enhancing the realistic feel of the tissue structure 30, especially when performing blunt dissection as in laparoscopic surgery, as the fibers can slide/move relative to each other dampening the resiliency of the silicone. Also, the tangled configuration of the fibers 50 make separation of the first layer 32 and the second layer 34 a function of pulling tangled fibers instead of pulling layers that are adhered with silicone or other adhesive. In a sense, the fibers act as an adhesive layer or mechanical linkage between the first layer 32 and the second layer 34. The adhesion being defined by the tangled fibers of the third layer 44 and the degree of their adhesion to the layers 32, 34. Separating the tangled fibers when pulling the first and second layers apart permits the surgeon to employ and practice respect for tissue techniques instead of using larger forces merely because the model is made of silicone, with adjoining layers firmly adhered with adhesive and the like. Therefore, the present invention is highly effective for making dissectible tissue models.

The method of manufacturing the simulated tissue structure 30 includes providing a second layer 34 of silicone. The second layer 34 of silicone is applied to a smooth or textured casting dish to create a thin layer of silicone. A spatula may be used to calendar the silicone evenly into a thin second layer 34. While the silicone of the second layer 34 is in an uncured state, the combination of the first layer 32 and the third layer 44 previously made is applied onto the lower surface 42 of the second layer 34 while the silicone of the second layer 34 is in an uncured state. In particular, the third layer 44 of polyester fibers 50 is placed onto the lower surface 42 of the second layer 34. The fibers 50 are then tamped down onto the second layer 34 to help embed the fibers 50 into the second layer 34. Any optional inclusions 48 are may be optionally provided onto the lower surface 42 of the second layer 32. The inclusions 48 are placed before the polyester fibers 50 are applied. The inclusions 48 together with the fiber layer may become adhered to the second layer 34 as the silicone cures. In one variation, the second layer 34 is allowed to cure before the first layer 32 and third layer 44 are overlaid onto the second layer 34 if adhesion of fiber only to the first layer 32 is desired.

In one variation, a frame is provided having a central window of a desired shape. The frame (not shown) is applied against the lower surface 40 of the first layer 32 and pressed down toward the second layer 34 to bring the perimeter of the first layer 32 into sealing contact with the uncured silicone of the second layer 34 capturing the third layer 44 in between creating a pocket of fibers 50 with or without inclusions 48. The perimeter areas of the first and second layers 32, 34 are without fibers, in one variation, ensuring that the first and second layers 32, 34 come into direct contact with each other to create and substantially seal the pocket. In another variation, the pocket is not created and the sides of the simulated tissue structure 30 are left open as shown in FIG. 1. The silicone of the second layer 34 is allowed to cure fully resulting in the third layer being attached and embedded in the upper surface 36 of the first layer 32 and the lower surface 42 of the second layer 34 in sandwich-like fashion. One of the first layer 32 and second layer 34 may have a greater thickness than the other. In another variation, both the first layer 32 and the second layer 34 have the same thickness.

The most basic variation of the simulated tissue structure 30 is a first layer 32 sheet of silicone with fibers 50 on one side. This basic variation can be combined with other processes to create models of increasing complexity having additional layers of silicone, fiber and inclusions provided on outer or inner surfaces. After the first layer 32 of silicone with fibers 50 added to one side is cured and removed from the casting dish 52, the second layer 34 of silicone can be applied to the same casting dish 52 and the previously made first layer 32 together with attached third layer 44 can be placed fiber-side down onto the uncured second layer 34. This results in a sandwich with thin sheets of silicone on the exterior and micro fibers and inclusions in the interior having various degrees and locations of being embedded and/or adhesion. This assembly can then be used alone or as a component to a larger and more complex model. The thickness of the first and second layers is approximately between 1.0 millimeter and 7.0 millimeters and, preferably, between 0.5 millimeters and 3 millimeters. The third layer is approximately between 2.5 millimeters to 25.0 millimeters.

Figure 3A:
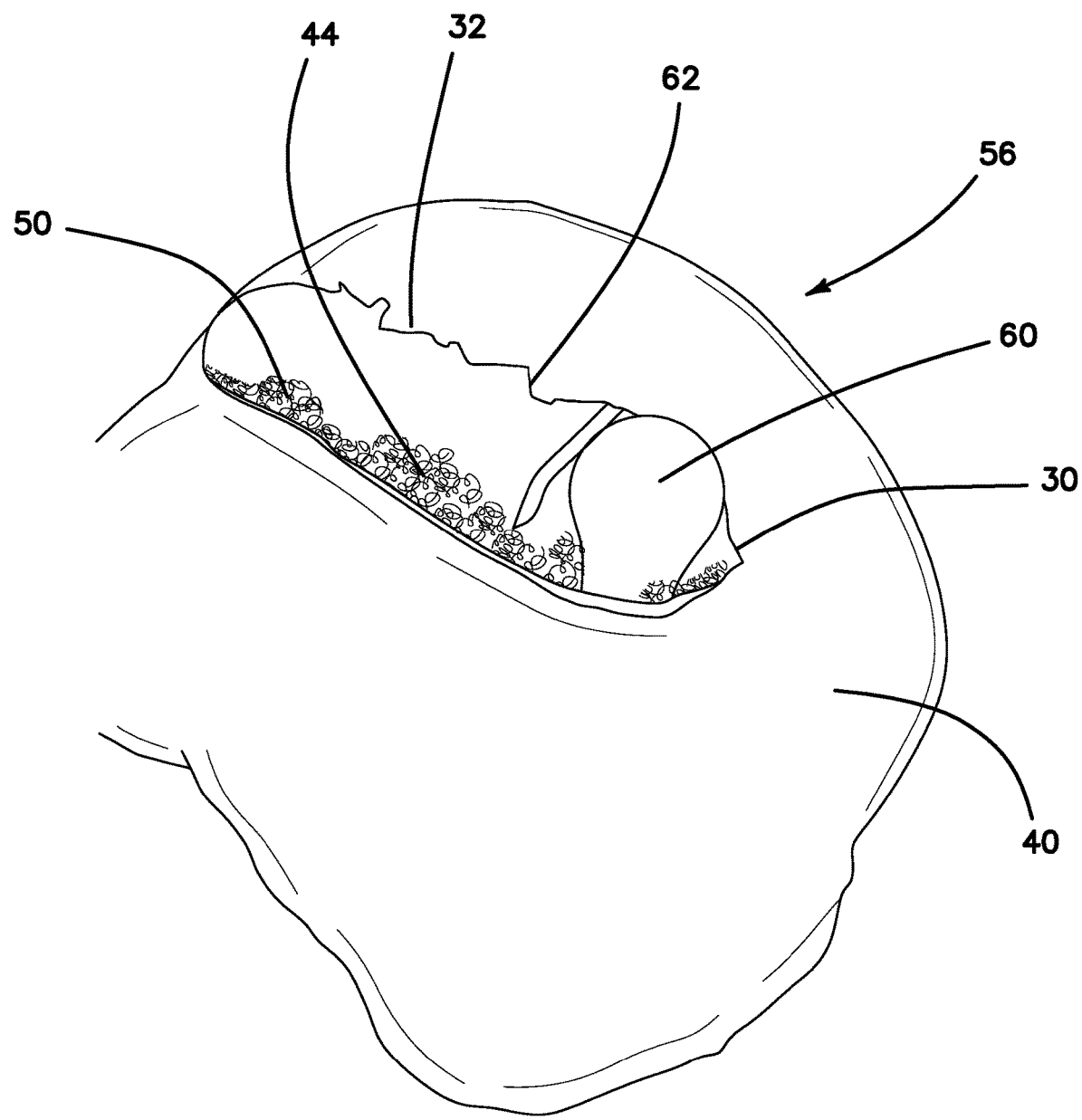
FIG. 3A is a top perspective view of an organ model made with a simulated tissue structure according to the present invention.
Figure 3B:
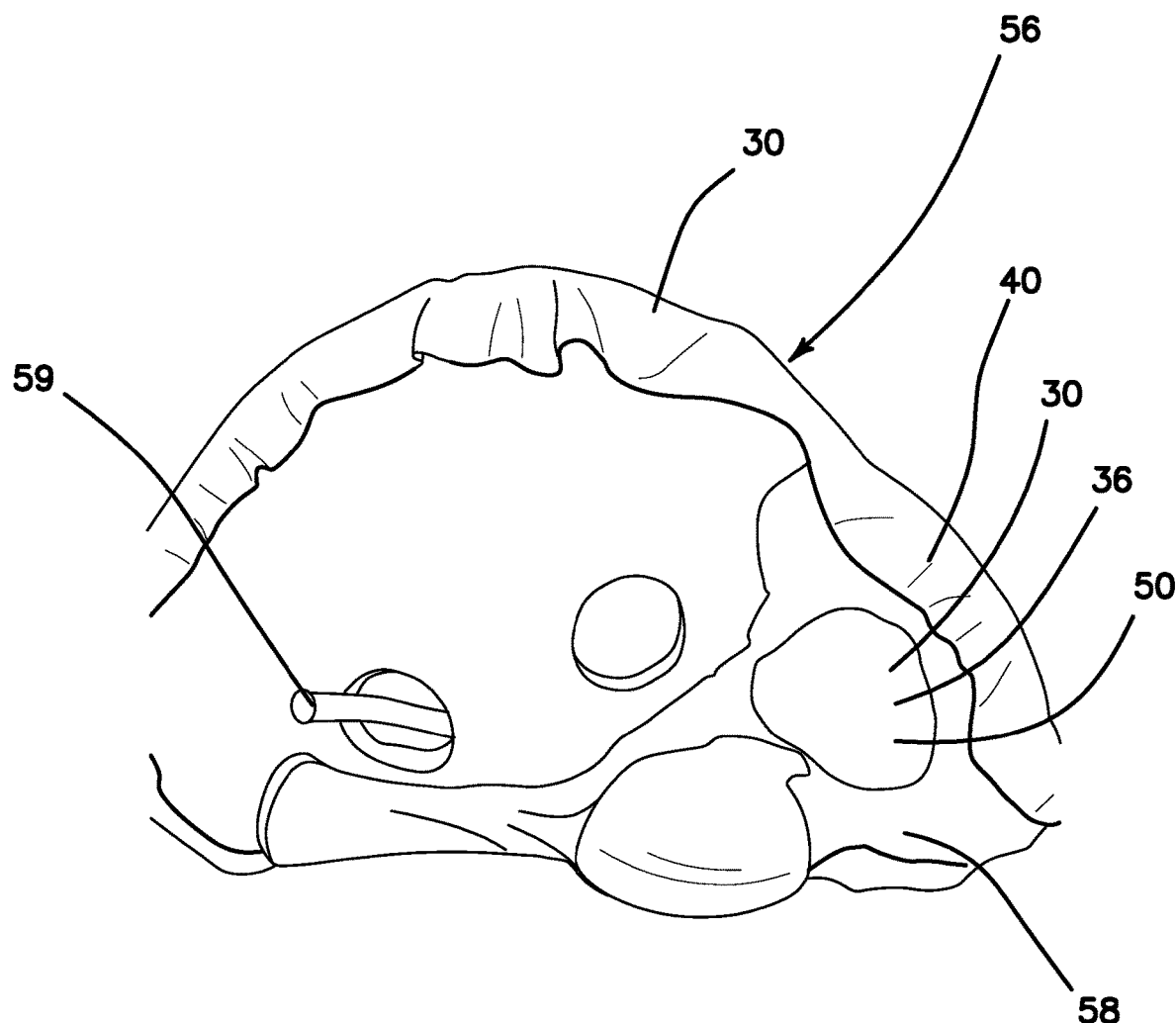
FIG. 3B is a top perspective view of an organ model made with a simulated tissue structure according to the present invention.
Figure 3C:
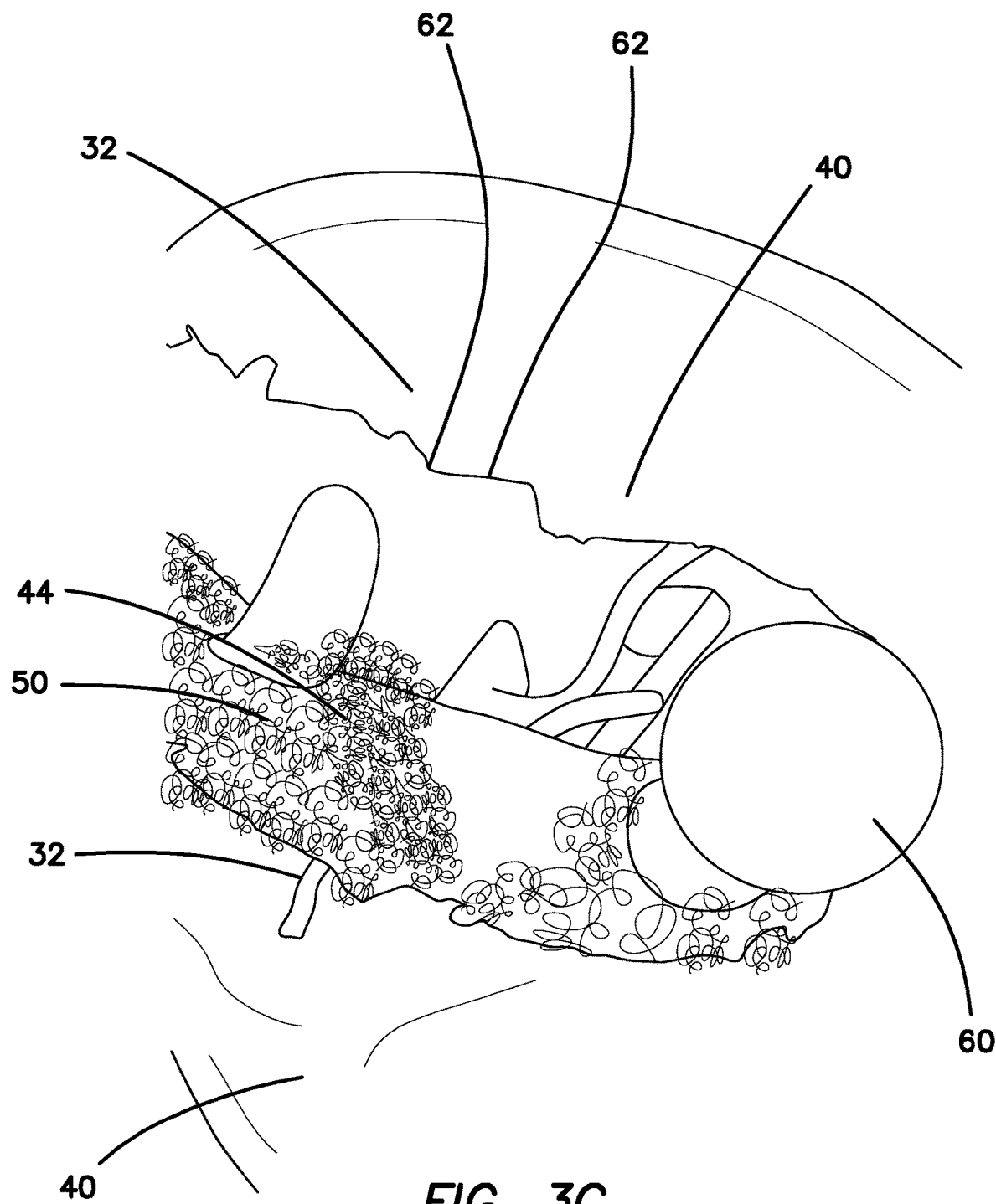
FIG. 3C is a top perspective, sectional view of an organ model made with a simulated tissue structure according to the present invention.

An example of the simulated tissue structure 30 being employed in a larger model is shown in FIGS. 3A-3C. FIGS. 3A-3C illustrates a pelvic model 56 with the simulated tissue structure 30 of the present invention. The pelvic model 56 includes a portion of a simulated pelvis 58. The simulated tissue structure 30 includes only a first layer 32 and a third layer 44 of fibers 50 without a second layer 34 of silicone. The upper surface 36 of the first layer 32 faces toward the simulated pelvis 58 such that the fibers 50 are located between the first layer 32 and the simulated pelvis. The simulated pelvis 58 serves as an armature on which the simulated tissue structure of the present invention is attached. The simulated tissue structure 30 of the present invention is placed over the simulated pelvis 58 that is shown to include other anatomical features including but not limited to ducts 59 and a defect 60 interior to the first layer 32. The edges of the first layer 32 are adhered to the backside of the simulated pelvis 58 as shown in FIG. 3B and optionally at other selected areas along the first layer 32. When the pelvic model 56 is approached by a surgeon employing a laparoscope, the lower surface 40 of the first layer 32 will be visualized first. Because of the textured surface of the first layer 32 and because of the varying placement and arrangement of the third layer 44 beneath the thin first layer 32, the model 56 will appear more realistic than a uniform layer of silicone without texturing or without the underlying fiber layer 44. If simulated anatomical structures and/or inclusions 48 are employed, the fiber layer 44 will advantageously serve to obscure portions of the structures/inclusions making them more difficult to discern making the dissection practice more realistic and difficult for the practitioner. Thicker areas of the third layer 44 from having more fiber will obscure underlying structures/inclusions 48 more than thinner areas of the third layer 44 having less fiber thickness. Also, the first layer 32 may vary in thickness itself permitting different degrees of visualization of the underlying structures/tissues. The first layer 32 may be dyed red or pink. The light-colored or white fibers 50 will make the overlaying first layer 32 appear lighter in color in certain locations. With the underlying third layer 44 of fiber, the first layer 32 will appear lighter red or lighter pink in certain areas relative to other locations where there is no fiber or less fiber. The surgeon will then practice making an incision 62 with a scalpel or a blunt surgical instrument. An incision 62 is shown in FIGS. 3A and 3C. Upon making the incision 62, the first layer 32 will not rebound due to the elasticity of the silicone itself which would resulting in the incision 62 appearing to close at an unrealistically fast rate or response. Instead, the incision 62 will remain substantially open as shown as a result of the fiber layer 44 dampening or holding back resiliency of the silicone itself. Also, the ability to mold very thin layers of silicone with the help of the fiber layer, the resulting thinner layer of silicone will have less thickness and reboundability. Under laparoscopic observation, the polyester fibers 50 appear to glisten as the fibers 50 reflect light in various directions advantageously making the simulated tissue structure 30 appear wet or moist as real tissue without the help of any liquid being present in the model. In laparoscopic simulations, the simulated tissue structures may appear unrealistic outside of a simulator or outside of a laparoscopic simulation environment and when observed with the naked eye, but because visualization takes place via a scope in a cavernous trainer that is artificially illuminated, certain liberties can be taken to achieve realistic advantages that could not be achieved for organs suitable for open procedures used outside the a laparoscopic simulation environment. In essence, the fibers 50 of the third layer 44 may appear very unrealistic as an organ or tissue simulation when observed with the naked eye but appear and behave very realistically in a laparoscopic training environment which will be described in greater detail below. After the incision 62 is made, the inclusions 48 including the ducts 59 and underlying artificial tissue structures 60 are exposed.

Figure 4:
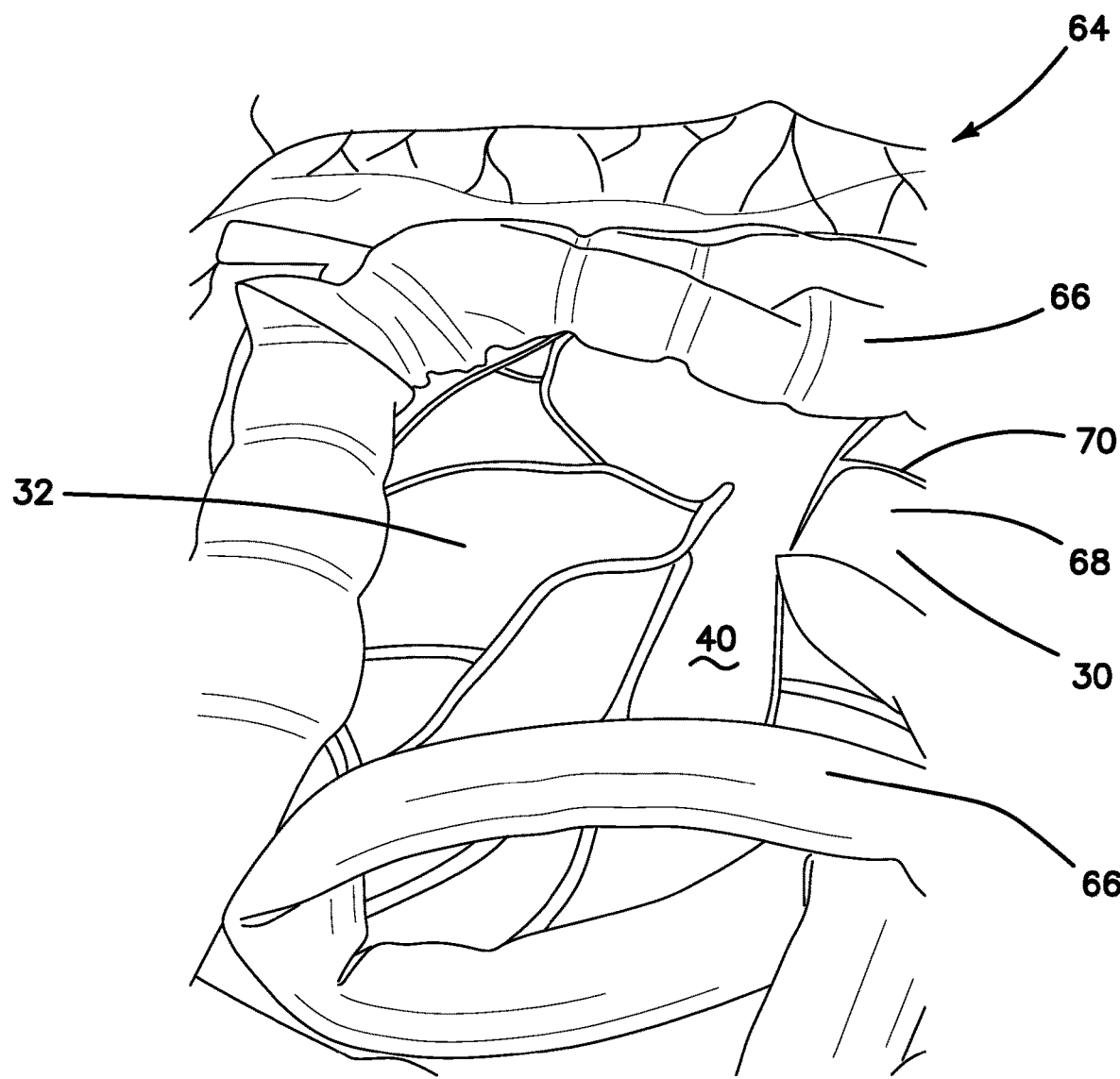
FIG. 4 is a top perspective, sectional view of an organ model made with simulated tissue structure according to the present invention.

Turning now to FIG. 4, there is shown another example in which the simulated tissue structure 30 of the present invention is employed in an organ model. FIG. 4 illustrates an abdominal organ model 64 that includes simulated bowels 66 atop a simulated mesentery or momentum layer 68 that comprises the simulated tissue structure 30 according to the present invention. The bottom surface 40 of the structure 30 is facing up and vasculature 70 is included as an inclusion 48 attached to the first layer 32. The vasculature 70 was attached to the first layer 32 before the third layer 44 of fiber 50 was embedded. Hence, the vasculature is clearly visible through the first layer 32. The simulated mesentery layer 68 is made of silicone that is dyed yellow and the vasculature is red in color and made of silicone.

Although a method of forming a substantially flat or pocket-like simulated tissue structure 30 was described previously hereinabove, a method of forming a tubular-shaped simulated tissue structure 30 according to the present invention will now be described. Uncured silicone is provided and applied evenly to a rotating mandrel to create the first layer 32. While the silicone of the first layer 32 is still wet, the polyester fiber layer is applied to form a third layer 44 of fibers 50. The fibers may be randomly or evenly applied or strategically applied forming areas where more or less fiber is intentionally located to effect a desired simulation outcome. The first layer 32 of silicone is allowed to cure to embed the fibers 50 into the first layer 32. The cured first layer 32 is taken off the mandrel and has a cylindrical shape with the lower surface 40 of the first layer 32 forming the interior of the cylinder and defining the cylinder lumen. The cylindrical shape of the first layer 32 and the third layer 44 may be inverted to place the fiber layer 44 inwardly and the lower surface 40 of the first layer 32 forming a smooth outer surface of the cylinder. Inclusions 48 may be applied to the outer surface of the cylinder either after inversion or prior to forming the first layer 32. In another variation, the cylinder is not inverted. A first strip of uncured silicone is applied onto a surface. The first strip has a length approximately equal to the length of the tubular first layer 32. The tubular first layer 32 and third layer 44 is aligned with the first strip and laid down onto the first strip with the fiber side of the combination facing the uncured first strip and tamped down to embed fibers 50 into the first strip. The first strip is allowed to cure to embed the fibers 50 of the third layer 44 into the first strip. A second strip of uncured silicone is applied to a surface. The second strip has a length approximately equal to the length of the tubular first layer 32. The tubular first layer 32, third layer 44 and first strip is laid onto the second strip while the silicone of the second strip is still wet to embed the fibers 50 of the third layer 44. The tubular first layer 32 is applied to the second strip offset from the first strip so that an adjacent portion of exposed fibers of the third layer 44 come in contact with the wet second strip, preferably adjacent to the first strip and slightly overlaying the first strip to form an almost continuous second layer 34. This process is repeated to form the second layer 34 from a plurality or any number of silicone sections or strips. The strips may be rectangular, triangular or any other shape to suitably cover the cylindrical surface and embed the third layer into the second layer 34. Different organ models such as bowels can be formed with the simulated tissue structure 30 having a tubular shape and any inclusions 48 can be provided directly to either side of the first layer 32 prior to the application of the fiber layer 44 or after the fiber layer 44 or directly to the second layer 34. In another variation, the second layer 34 is not applied and the simulated tissue structure includes the first and second third layer and any inclusions 48.

Figure 5:
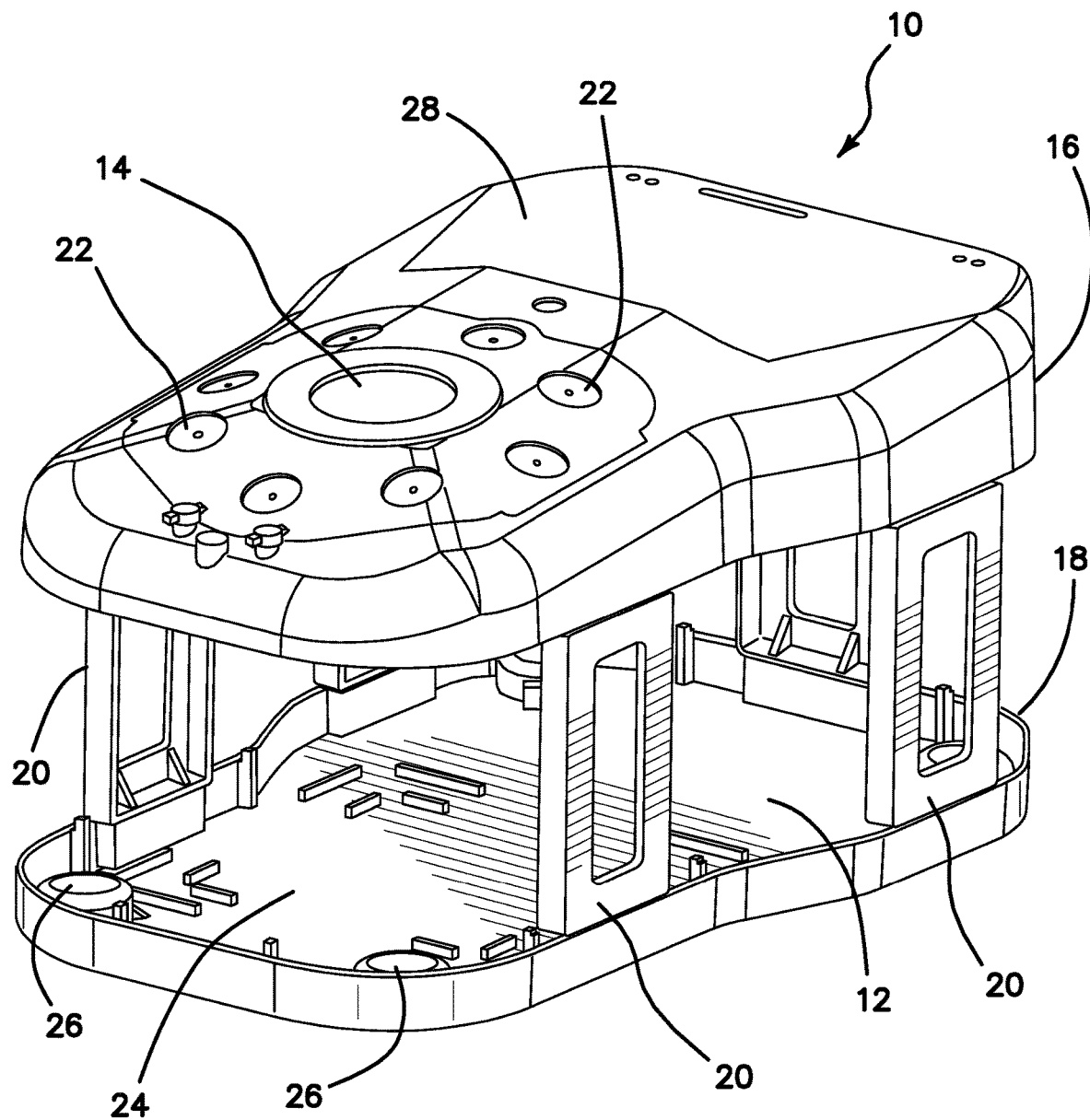
FIG. 5 is a top perspective view of a surgical training device according to the present invention.

In another variation, the simulated tissue structure 30 by itself or formed as part of another larger model or tissue structure such as the abdominal organ model 64 or pelvic model 56 described above with respect to FIGS. 3A-3C and FIG. 4 is sized and configured to be placed inside a simulated laparoscopic environment such as a surgical training device 10 of the like shown in FIG. 5. Of course, the simulated tissue structure may also be used to practice open surgical procedures.

A surgical training device 10 that is configured to mimic the torso of a patient such as the abdominal region is shown in FIG. 5. The surgical training device 10 provides a body cavity 12 substantially obscured from the user for receiving simulated or live tissue or model organs or training models of the like described in this invention. The body cavity 12 is accessed via a tissue simulation region 14 that is penetrated by the user employing devices to practice surgical techniques on the tissue or practice model found located in the body cavity 12. Although the body cavity 12 is shown to be accessible through a tissue simulation region, a hand-assisted access device or single-site port device may be alternatively employed to access the body cavity 12. An exemplary surgical training device is described in U.S. patent application Ser. No. 13/248,449 entitled "Portable Laparoscopic Trainer" filed on Sep. 29, 2011 and incorporated herein by reference in its entirety. The surgical training device 10 is particularly well suited for practicing laparoscopic or other minimally invasive surgical procedures.

Still referencing FIG. 5, the surgical training device 10 includes a top cover 16 connected to and spaced apart from a base 18 by at least one leg 20. FIG. 5 shows a plurality of legs 20. The surgical training device 10 is configured to mimic the torso of a patient such as the abdominal region. The top cover 16 is representative of the anterior surface of the patient and the space 12 between the top cover 16 and the base 18 is representative of an interior of the patient or body cavity where organs reside. The surgical trainer 10 is a useful tool for teaching, practicing and demonstrating various surgical procedures and their related instruments in simulation of a patient undergoing a surgical procedure. Surgical instruments are inserted into the cavity 12 through the tissue simulation region 14 as well as through pre-established apertures 22 in the top cover 16. Various tools and techniques may be used to penetrate the top cover 16 to perform mock procedures on simulated organs or practice models placed between the top cover 16 and the base 18. The base 18 includes a model-receiving area 24 or tray for staging or holding a simulated tissue model or live tissue. The model-receiving area 24 of the base 18 includes frame-like elements for holding the model (not shown) in place. To help retain a simulated tissue model or live organs on the base 18, a clip attached to a retractable wire is provided at locations 26. The retractable wire is extended and then clipped to hold the tissue model in position substantially beneath the tissue simulation region 14. Other means for retaining the tissue model include a patch of hook-and-loop type fastening material affixed to the base 18 in the model receiving area 24 such that it is removably connectable to a complementary piece of hook-and-loop type fastening material affixed to the model.

A video display monitor 28 that is hinged to the top cover 16 is shown in a closed orientation in FIG. 5. The video monitor 28 is connectable to a variety of visual systems for delivering an image to the monitor. For example, a laparoscope inserted through one of the pre-established apertures 22 or a webcam located in the cavity and used to observe the simulated procedure can be connected to the video monitor 28 and/or a mobile computing device to provide an image to the user. Also, audio recording or delivery means may also be provided and integrated with the trainer 10 to provide audio and visual capabilities. Means for connecting a portable memory storage device such as a flash drive, smart phone, digital audio or video player, or other digital mobile device is also provided, to record training procedures and/or play back pre-recorded videos on the monitor for demonstration purposes. Of course, connection means for providing an audio visual output to a screen larger than the monitor is provided. In another variation, the top cover 16 does not include a video display but includes means for connecting with a laptop computer, a mobile digital device or tablet and connecting it by wire or wirelessly to the trainer.

When assembled, the top cover 16 is positioned directly above the base 18 with the legs 20 located substantially around the periphery and interconnected between the top cover 16 and base 18. The top cover 16 and base 18 are substantially the same shape and size and have substantially the same peripheral outline. The internal cavity is partially or entirely obscured from view. In the variation shown in FIG. 5, the legs include openings to allow ambient light to illuminate the internal cavity as much as possible and also to advantageously provide as much weight reduction as possible for convenient portability. The top cover 16 is removable from the legs 20 which in turn are removable or collapsible via hinges or the like with respect to the base 18. Therefore, the unassembled trainer 10 has a reduced height that makes for easier portability. In essence, the surgical trainer 10 provides a simulated body cavity 12 that is obscured from the user. The body cavity 12 is configured to receive at least one surgical model accessible via at least one tissue simulation region 14 and/or apertures 22 in the top cover 16 through which the user may access the models to practice laparoscopic or endoscopic minimally invasive surgical techniques.

Figure 6:
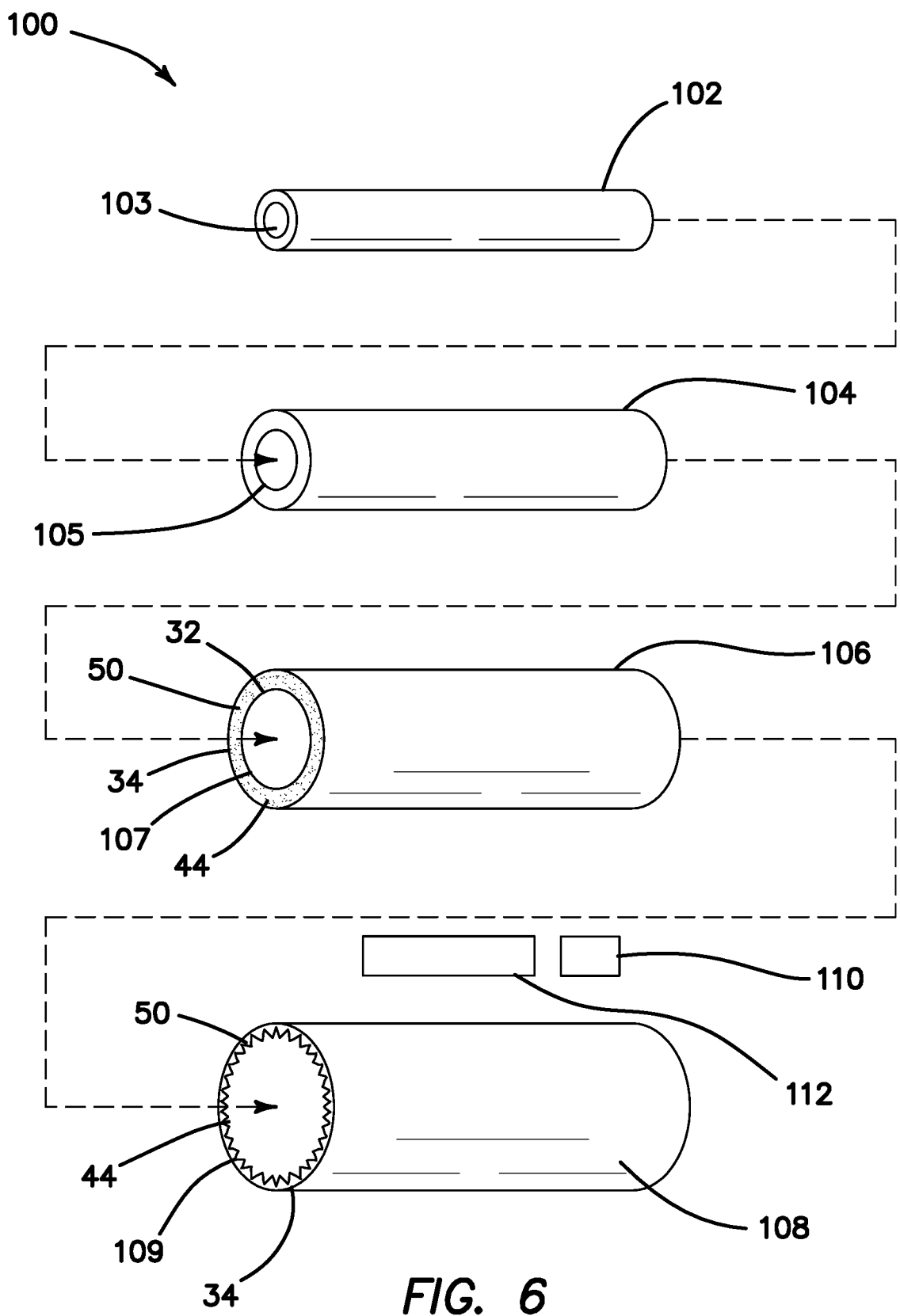
FIG. 6 is an exploded view of a simulated rectum model according to the present invention.
Figure 7:
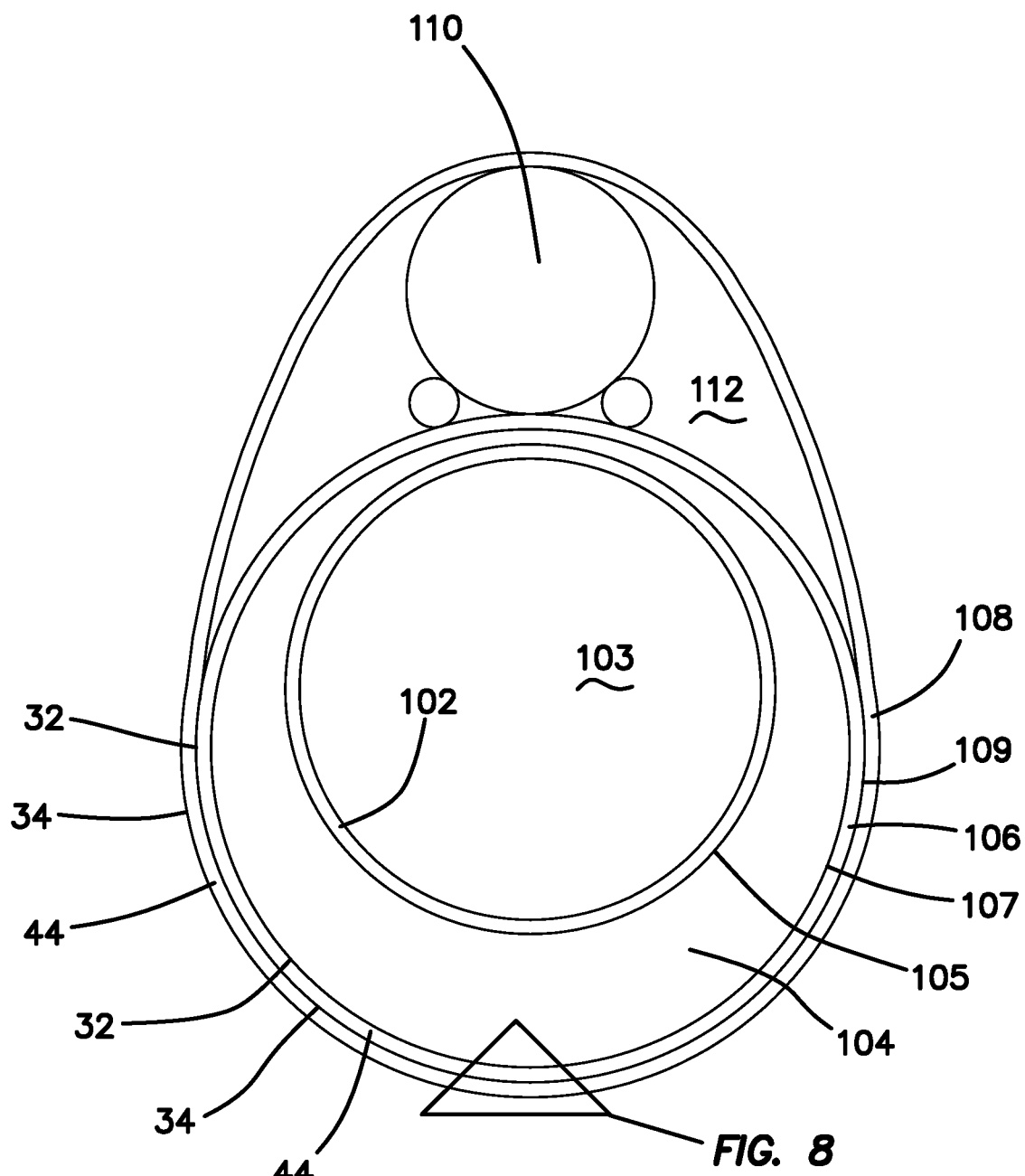
FIG. 7 is a cross-sectional view of a simulated rectum model according to the present invention.
Figure 8:
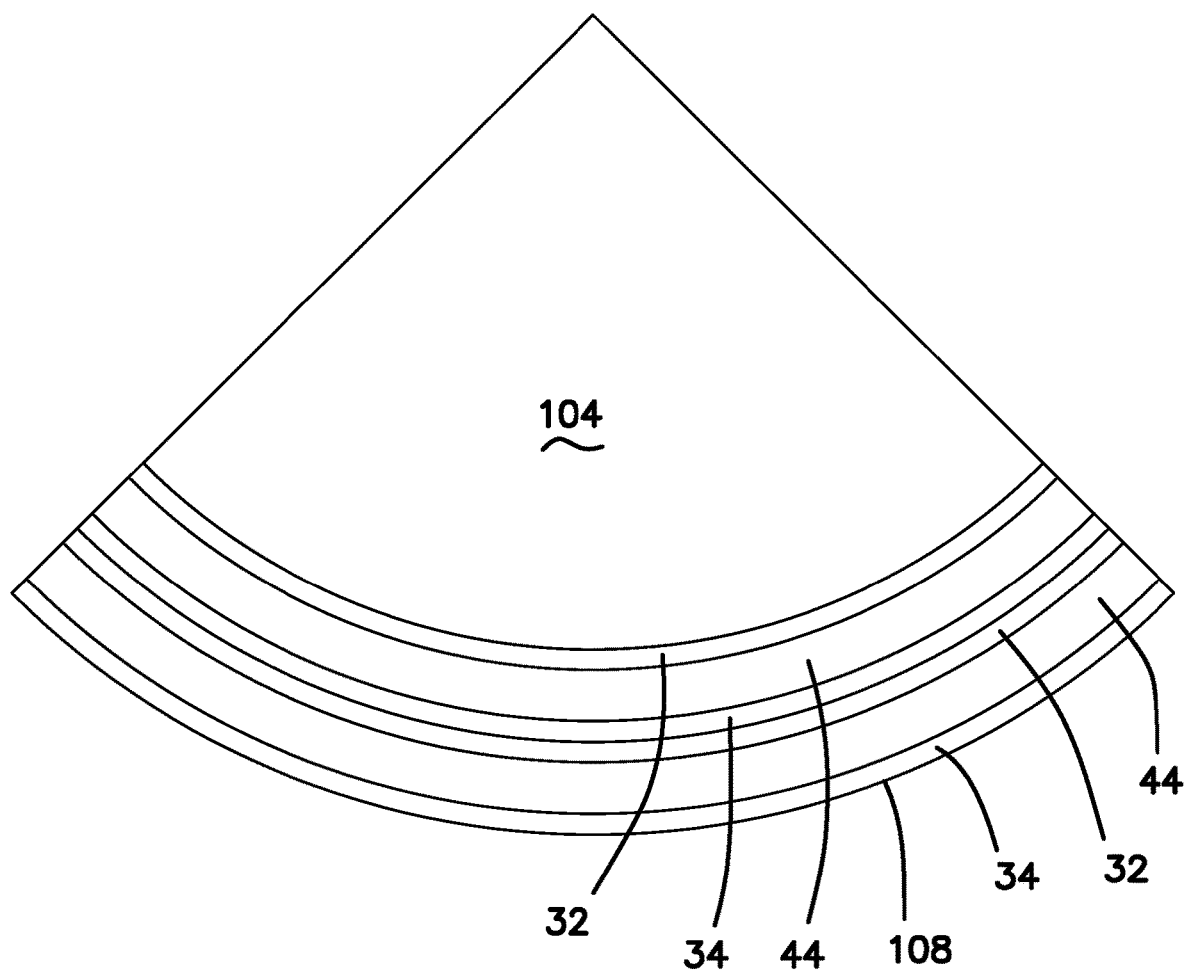
FIG. 8 is a sectional view of a cross-section of a simulated rectum model according to the present invention.

Turning now to FIGS. 6-8, a simulated rectum model 100 comprising a composite of simulated tissue structures 30 will now be described. The simulated rectum model 100 includes a first tube 102 made of silicone. The first tube 102 may include an embedded mesh material such that the first tube 102 is capable of retaining sutures such that they do not pull out or tear through the silicone. The first tube 102 defines a first lumen 103 extending between a proximal end and a distal end.

The simulated rectum model 100 further includes a second tube 104 defining a second lumen 105 and extending between a proximal end and a distal end. The second tube 104 is made of yellow urethane foam. A layer of foam is formed and then folded into a cylindrical shape and the ends adhered to form a tube. The anterior end of the urethane foam second tube 104 is thinner as shown in FIG. 6. The second lumen 105 is dimensioned to receive the first tube 102 inside the second lumen 105 in a concentric-like fashion. The second tube 104 is adhered to the first tube 102 using cyanoacrylate glue.

The model 100 further includes a third tube 106. The third tube 106 is simulated tissue structure 30 of the like described above having a first layer 32, a second layer 34 and a third layer 44 of polyfill fiber 50 that is formed into a cylindrical tube to define a third lumen 107. The first layer 32 of the third tube 106 is yellow in color and the second layer 34 is white in color. The third layer 44 is made of white polyfill fiber. The diameter of the third lumen 107 is dimensioned to receive the second tube 104 inside the third lumen 107 in an eccentric fashion. The third tube 106 is adhered to the second tube 104 with adhesive such as cyanoacrylate glue.

The simulated rectum model 100 further includes a fourth tube 108. The fourth tube 108 is simulated tissue structure 30 of the like described above having a first layer 32 and a third layer 44 of polyfill fiber 50 but does not have a second layer 34 that is formed into a cylindrical tube to define a fourth lumen 109 such that the third layer 44 of free polyfill fibers faces the fourth lumen 109. The second layer 34 is pink in color. The third layer 44 is made of white polyfill fiber. In one variation, the fourth tube 108 includes a second layer 34 that is white in color. The diameter of the fourth lumen 109 is dimensioned to receive the third tube 106 inside the fourth lumen 109 in a concentric-like fashion. The fourth tube 108 is adhered to the third tube 106 with adhesive in select areas.

The simulated rectum model 100 further includes a simulated prostate system 110 located between the third tube 106 and the fourth tube 108. The simulated prostate system 110 is located at the anterior side of the model 100. The simulated prostate system 110 includes a simulated prostate, simulated seminal vesicles, simulated bladder, simulated urethra, and simulated vas deferens. The simulated urethra and simulated vas deferens are made of silicone formed into a solid tube. The simulated seminal vesicles are made of urethane foam over molded onto the simulated vas deferens. The simulated prostate is made of urethane foam over molded onto the simulated urethra.

The simulated rectum model 100 further includes additional polyfill material located between the fourth tube 108 and the third tube 106 at the anterior side of the model 100 and surrounding the simulated prostate system 110.

The simulated rectum model 100 is fantastically suited for practicing transanal total mesorectal excision (TaTME) for cancer located in the lower rectum. In such a surgical procedure the cancerous simulated rectum is approached through the anus via a sealable port connected to a channel that is inserted into the simulated rectum. A purse-string suture seals off the cancerous portion of the rectum. The purse-string suture is a type of suture technique that the user of the model 100 can practice. It involves suturing around the circumference of the rectum and pulling it tight to seal off the area of the rectum that includes the tumor. The first tube 102 includes mesh embedded in the silicone layer of the tube to hold the purse-string suture in place. The silicone layer of the first tube 102 allows the purse-string suture to be pulled tight. Then, the surgeon will cut down posteriorly through the second tube 104 which represents the mesorectum. The surgeon will continue to dissect through the first layer 32 of the third tube 106 and then dissect circumferentially around in the third layer 44 of the third tube 106 being careful not to penetrate the second layer 34 of the third tube 106 because doing so would endanger the adjacent simulated prostate system 110. The first layer 32 of the third tube 106 is yellow, which is the same color as the simulated mesorectum, second tube 104, making it hard to distinguish apart from the second tube 104. While dissecting circumferentially around in the third layer 44, care must be taken not to penetrate the second layer 34, because the third layer 44 is made of white polyfill and the second layer 34 is made of white silicone making them difficult to distinguish, thereby, teaching the practitioner to exercise due care. The fourth tube 108, and in particular, the second layer 34 of the fourth tube 108 is red, representing the muscle and the pelvic floor. Accidental dissection into the second layer 34 of the fourth tube 108 and circumferential progression of dissection in this location would possibly lead to intersection with the simulated prostate system 110 which this model 100 teaches the surgeon to avoid. Dissection within the third layer 44 of the third tube 106 leads to a safe excision of the simulated prostate system 110. After dissecting posteriorly, anterior dissection begins by dissecting through the thinner section of the simulated mesorectum (second tube 104) until the third tube 106 is reached. When in the third tube 106, and in particular, the third layer 44 of the third tube 106, dissection proceeds circumferentially until the dissection meets the posterior dissection. The simulated mesorectum (second tube 104) has an area of reduced thickness and the third tube 106 is attached to the second tube 104 and indistinguishably colored when comparing the yellow first layer 32 with the yellow second tube 104. The simulated prostate system 110 is located on top of the third tube 106 as shown in FIG. 7 and it is surrounded with polyfill fiber 112 which makes it harder to distinguish from the polyfill fiber of the third layer 44 of the third tube 106 while dissecting in the third tube 106. Dissection proceeds until the pelvic cavity is breached.

The proximal end of the simulated rectum model 100 may be attached to a transanal adapter. The transanal adapter is a leg 20 used to space apart the top cover 16 from the base 18 of a surgical trainer 10 to provide access into the model 100 from the side of the surgical trainer. The transanal adapter includes an opening that is connected to the first lumen 103 of the first tube 102. Surrounding the opening of the transanal adapter, soft silicone is provided to simulate an anus. The practice of the surgical TaTME procedure is performed through the opening of the transanal adapter with a circumferential purse string suture placed proximal to the transanal adapter with the simulated prostate system located distal to the transanal adapter.

The simulated rectum model 100 is manufactured by first placing a mesh sheath on a mandrel and paining uncured silicone over the mesh. The second tube 104 (simulated mesorectum) is made of urethane foam that is cast into a flat sheet. The foam is cast to have a thinner section. The simulated mesorectum is wrapped into a cylinder around the first tube 102 to create the second tube 104. Cyanoacrylate glue is used together with a primer to adhere the thicker portions of the second tube 104 together on the posterior side of the simulated rectum 100. To form the third tube 106, a thin planar sheet of yellow silicone is cast onto foam to create the first layer 32. While the silicone of the first layer 32 is still wet, a layer of polyfill is evenly placed on top to create the third layer 44 of polyfill. After the first layer 32 cures, it is de-molded. A new layer of white-colored or clear silicone is cast on the foam to form the second layer 34. The previously-cured first layer 32 together with the polyfill third layer 44 is placed on top with the polyfill third layer 44 touching the wet silicone of the second layer 34. The assembly is demolded and wrapped around the second tube 104 to form a cylindrical third tube 106 which is adhered to the second tube 104 using cyanoacrylate glue. The fourth tube 108 is formed in a similar fashion as the third tube 106.

To form the fourth tube 108, a thin planar sheet of white or clear silicone is cast onto foam to create the first layer 32. While the silicone of the first layer 32 is still wet, a layer of polyfill is evenly placed on top to create the third layer 44 of polyfill. More polyfill fiber is added to create an area where the third layer 44 is thicker as shown in FIG. 7. After the first layer 32 cures, the third layer 44 is adhered and the combination of the first layer 32 and the third layer 44 is de-molded. A new layer of red-colored silicone is cast on the foam to form the second layer 34 of the fourth tube 108. The previously-cured first layer 32 together with the polyfill third layer 44 is placed on top with the polyfill third layer 44 touching the wet silicone of the second layer 34. Once cured, the assembly is demolded and wrapped around the third tube 106 to form a cylindrical fourth tube 108 which is adhered to the third tube 106 using cyanoacrylate glue or silicone dots. The simulated prostate system 110 is previously formed and located between the third tube 106 and the fourth tube 108.

Figure 9A:
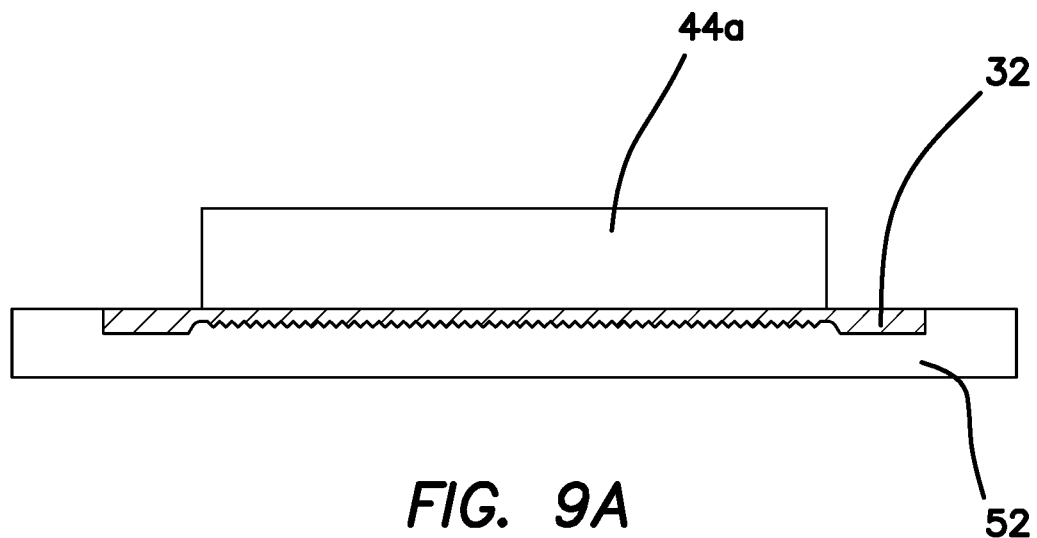
FIG. 9A is cross-sectional view of a casting dish, a first layer of silicone and a first layer of fiber according to the present invention.
Figure 9B:
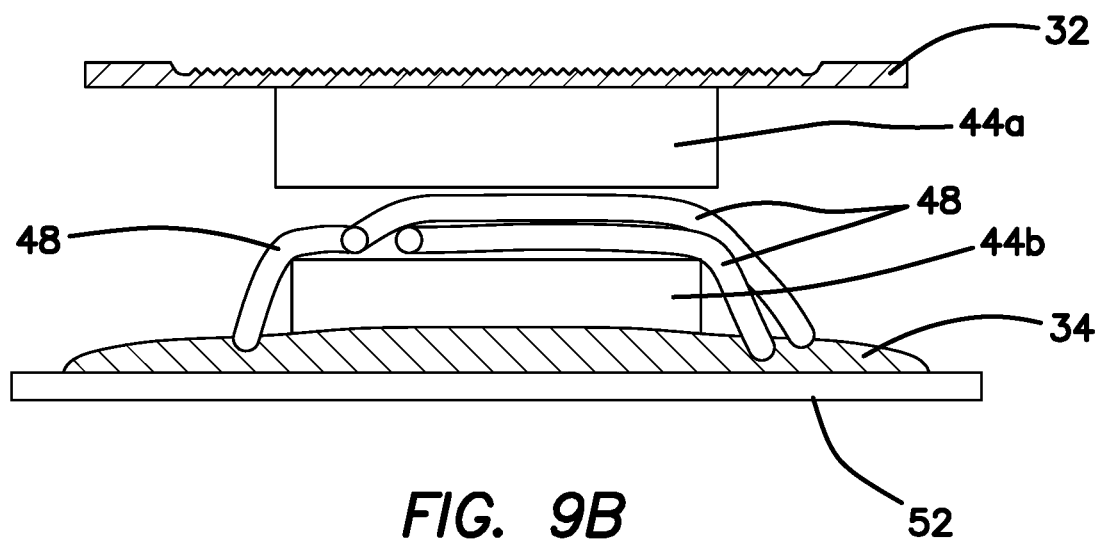
FIG. 9B is a cross-sectional view of the first layer of silicone and first layer of fiber of FIG. 9A located above a casting dish, a second layer of silicone, a second layer of fiber and simulated vessels according to the present invention.

Turning now to FIG. 9A, there is shown a casting dish 52 that has a textured molding surface. The surface may vary in thickness. A first layer 32 of uncured silicone is poured into the casting dish 52. Before it is allowed to cure, a third layer 44a of fiber is placed on top of the first layer 32 such that fibers on one side of the third layer 44a are embedded into the first layer 32. The first layer 32 is allowed to cure. After curing, the first layer 32 is removed from the casting dish 52 with the help of the third layer 44a. The third layer 44a and the first layer 32 are pulled up from the casting dish 52. Because the third layer 44a adhered to the first layer 32, pulling up on the third layer 44a allows the fibers of the third layer 44a to distribute the removal force and advantageously prevent the thin first layer 32 from tearing during removal. After the combination of the first layer 32 and the third layer 44a is removed, it is inverted and placed in juxtaposition to a second casting dish 52 with a second layer 34 of wet silicone as shown in FIG. 9B. Another third layer 44b of fiber is placed onto the second layer 32 of wet silicone. Inclusions 48 are placed over the third layer 44b. Part of the inclusions 48 are placed in contact with the second layer 34 and remains embedded in the second layer 34 when the second layer 34 finishes curing. The third layer 44b also is embedded into the second layer 34. In one variation, the inclusions 48 are not embedded in the second layer 34 and are located between the third layers 44a, 44b. When the first layer 32 with the first third layer 44a are placed over the second layer 34, the inclusions 48 and the second third layer 44b, the construct is completed. In another variation, the first layer 32 is placed into contact with the second layer 34 while the second layer 34 is still uncured to adhere the first layer 32 and create a pocket that includes the inclusions 48 and third layers 44a, 44b. In another variation, portions of the third layer 44a are also embedded into the second layer 34 while the silicone is still wet to embed the third layer 44a into the second layer 34. The inclusions 48 shown in FIG. 9B are vasculature made of silicone; however, the invention is not so limited and the inclusions 48 may be any inclusion, anatomical structure, landmark, organ, nerves, tissue, tumors and the like.

Figure 10A:
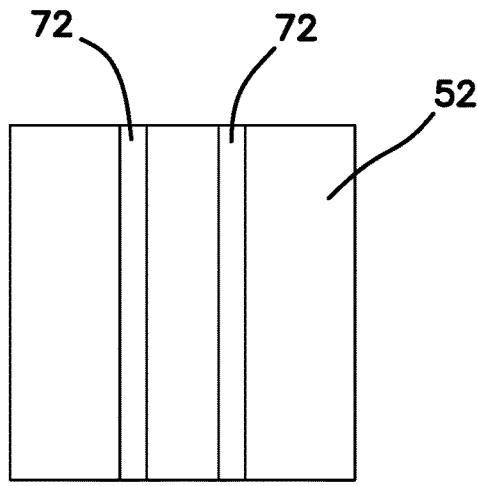
FIG. 10A is a top view of a casting dish according to the present invention.
Figure 10B:
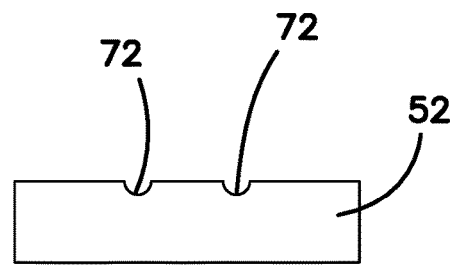
FIG. 10B is a side elevational view of the casting dish of FIG. 10A according to the present invention.
Figure 11A:
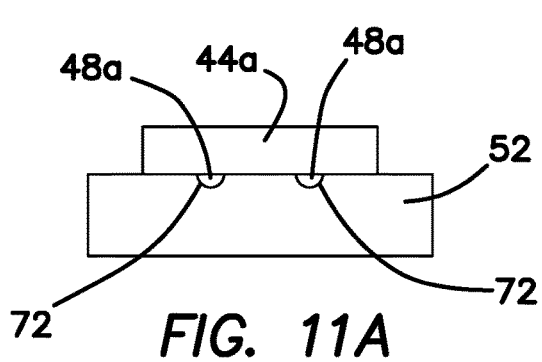
FIG. 11A is a side elevational view of a casting dish, a layer of wet foam and a layer of fiber according to the present invention.
Figure 11B:
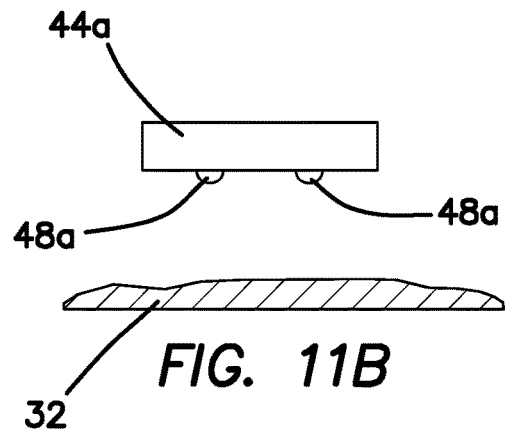
FIG. 11B is a side elevational view of the first layer of fiber and layer of foam from FIG. 11A located above a second layer of silicone according to the present invention.
Figure 11C:
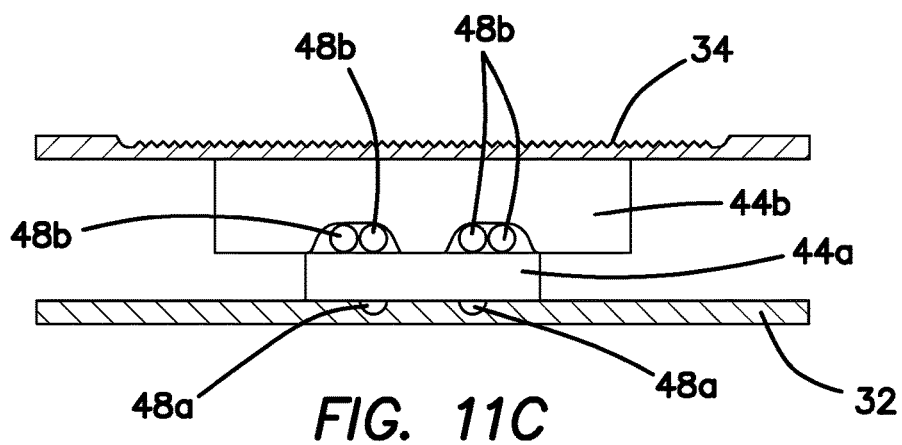
FIG. 11C is a side elevational view of the first layer of fiber and layer of foam and second layer of silicone of FIG. 11B located beneath a second layer of fiber, third layer of silicone and artificial vessels according to the present invention.

Turning now to FIGS. 10-11 with particular reference to FIGS. 10A-10B, there is shown a casting dish 52 having two channels 72 for receiving uncured silicone. Although two channels 72 are shown any pattern can be employed to receive uncured material and form a desired structure including but not limited to anatomical structures and landmarks, tissues, nerves, vasculature, tumors, organs and the like. The material may include uncured silicone, uncured urethane foam, uncured silicone foam and the like. In one variation, wet uncured urethane foam is poured into the channels 72 to create a first inclusion 48a as shown in FIG. 11A. A first fiber layer 44a is placed on top of the uncured foam 48a inside the channels 72 to embed the fiber layer 44a into the uncured foam. The uncured silicone inside the channels 72 is allowed to cure and as a result become attached to the first fiber layer 44a. The first fiber layer 44a together with the formed inclusions 48a are removed from the casting dish 52 and placed in juxtaposition to a first layer 32 of uncured silicone as shown in FIG. 11B. The first fiber layer 44a with the attached first inclusions 48a are pressed into the first layer 32 while the silicone is still wet to embed the first inclusions 48a and the first fiber layer 44a into the first layer 32 as shown in FIG. 11C. The first inclusions 48a are configured to depict and mimic nerves; however, the first inclusions 48a can be any type of inclusion suitable for the simulated tissue structure. A second fiber layer 44b made of fiber is provided together with one or more second inclusion 48b. The second inclusions 48b are attached to the second fiber layer 44b in the same manner as described above with respect to the first fiber layer 44a and first inclusions 48a and may be made of silicone, silicone foam, urethane foam and the like. A casting dish is provided that is configured with a pattern for molding the one or more second inclusion 48b. The pattern is filled with wet silicone, for example, and while uncured, the second fiber layer 44b is overlaid onto the casting dish and wet silicone of the second inclusions 48b to embed and attach the second inclusions 48b to the second fiber layer 44b along a first side of the second fiber layer 44b. The second side of the second fiber layer 44b is embedded into a second layer 34 while the second layer 34 is still uncured. When the second inclusions 48b and the second layer 34 are cured the second fiber layer 44b and the second layer 34 together with the second inclusions 48b are removed from the respective casting dishes and placed on the first fiber layer 44a, first layer 32 and first inclusions 48a to create the sandwich-like simulated tissue construct. The second inclusions 48b are configured to mimic vasculature or any other anatomical structure, tissue, organ, nerve, tumor and the like. One or more of the first fiber layer 44a and second fiber layer 44b, create ideal dissection pathways for skeletonizing any one or more of the inclusions 48a, 48b wherein the dissection pathway through the fiber creates a realistic look and feel with the fibers being capable of being cut and/or spread apart to separate and expose the layers and inclusions for removal.

Any portion of the model 30 can be made of one or more organic base polymer including but not limited to hydrogel, single-polymer hydrogel, multi-polymer hydrogel, rubber, latex, nitrile, protein, gelatin, collagen, soy, non-organic base polymer such as thermo plastic elastomer, Kraton, silicone, foam, silicone-based foam, urethane-based foam and ethylene vinyl acetate foam and the like. Into any base polymer one or more filler may be employed such as a fabric, woven or non-woven fiber, polyester, non-absorbent fiber, nylon, mesh, cotton and silk, conductive filler material such as graphite, platinum, silver, gold, copper, miscellaneous additives, gels, oil, cornstarch, glass, dolomite, carbonate mineral, alcohol, deadener, silicone oil, pigment, foam, poloxamer, collagen, gelatin and the like. The adhesives employed may include but are not limited to cyanoacrylate, silicone, epoxy, spray adhesive, rubber adhesive and the like.

It is understood that various modifications may be made to the embodiments and variations disclosed herein. Therefore, the above description should not be construed as limiting, but merely as exemplifications of preferred embodiments. Those skilled in the art will envision other modifications within the scope and spirit of the present disclosure.

We claim:

1. A method of manufacturing a simulated tissue structure for surgical training, the method comprising the steps of:
   providing a casting dish having a textured molding surface;
   pouring a first layer of uncured silicone into the casting dish;
   placing a first layer of fiber on top of the first layer of uncured silicone such that fibers on one side of the first layer of fiber are embedded into the first layer;
   allowing the first layer with embedded fibers to cure; and
   removing the cured first layer of silicone with embedded fibers from the casting dish.

2. The method of claim 1 wherein the step of removing the cured first layer of silicone with embedded fibers comprises pulling up on the first layer of fiber to distribute the removal force, thereby preventing the cured first layer of silicone from tearing during removal.

3. The method of claim 1 further comprising the steps of:
   pouring a second layer of uncured silicone into a smooth or textured molding surface of a second casting dish to form a second layer of silicone;
   placing a second layer of fiber on top of the second layer of uncured silicone such that fibers on one side of the second layer of fiber are embedded into the second layer;
   placing, while the silicone of the second layer is in an uncured state, the cured first layer of silicon with embedded fibers in juxtaposition to the second layer of silicone with embedded fibers such that the first and second layers of fiber are facing each other; and
   allowing the second layer of silicone to cure, wherein the curing step is performed after placing the cured first layer of silicon with embedded fibers.

4. The method of claim 3 further comprising the step of inverting the cured first layer of silicon with embedded fibers, wherein the inverting step is performed after removing the cured first layer of silicone with embedded fibers from the casting dish and prior to placing it in juxtaposition to the second layer of silicone.

5. The method of claim 3 further comprising the step of placing one or more inclusions over the second layer of fiber prior to placing the cured first layer of silicon with embedded fibers.

6. The method of claim 5 wherein the placing step is performed such that the one or more inclusions are located between the first layer of fiber and the second layer of fiber.

7. The method of claim 5 wherein the placing step is performed such that at least part of the one or more inclusions are in direct contact with the second layer of silicone so as to remain embedded after curing the second layer.

8. The method of claim 5 further comprising the step of creating a pocket that includes the one or more inclusions and the first and second layers of fiber.

9. The method of claim 8 wherein the step of creating a pocket comprises placing, while the silicone of the second layer is in an uncured state, perimeters of the cured first layer of silicone into contact with the second layer of uncured silicone.

10. The method of claim 9 wherein portions of the first layer of fiber are placed in contact with the second layer of uncured silicone so as to remain embedded after curing the second layer.

11. The method of claim 5 further comprising the step of embedding a lower surface of the second layer of fiber into one or more second inclusions when the one or more second inclusions are in their uncured state, wherein the embedding step is performed prior to placing the second layer of fiber on top of the second layer of uncured silicone.

12. The method of claim 11 wherein, once the second layer of fiber is placed on top of the second layer of uncured silicone, the one or more second inclusions are in direct contact with the second layer of uncured silicone so as to remain embedded after curing the second layer.

13. The method of claim 1, wherein the texture molding surface varies in thickness, thereby providing a layer with variable thickness.

14. A simulated tissue structure for surgical training, comprising:
- a first layer of silicone polymer with an upper surface and a lower surface;
- a second layer of silicone polymer with an upper surface and lower surface; the second layer being spaced apart from the first layer such that the upper surface of the first layer faces the lower surface of the second layer; and
- a third layer made of a plurality of entangled fibers located between the first layer and the second layer; the third layer being partially embedded in the first layer at the upper surface of the first layer;
- a fourth layer made of a plurality of entangled fibers located between the first layer and the second layer; the fourth layer being partially embedded in the second layer at the lower surface of the second layer; and
- at least one inclusion located between the third layer and the fourth layer,
- wherein the plurality of entangled fibers of the third and fourth layers act as an adhesive layer of fiber between the first layer and the second layer to create a dissection plane for practice of surgical excision of the at least one inclusion.

15. The simulated tissue structure of claim 14 wherein the adhesion between the first and second layers is defined by the plurality of entangled fibers of each of the third and fourth layers and their respective degree of adhesion to the first and second layers.

16. The simulated tissue structure of claim 14 wherein each of the plurality of entangled fibers of the third and fourth layers are in the form of a strand, filament, yarn, or micro-fiber having a length and a first free end and a second free end.

17. The simulated tissue structure of claim 14 wherein the plurality of entangled fibers of the third and fourth layers are selected from a group consisting of polyester, polyamide, acrylic, acetate, polyolefin, cotton, fiberfill, batting, polyethylene terephthalate, polyethylene naphthalate, nylon, polyfill, polymer, plastic, spandex, natural fiber, non-absorbent fiber, and synthetic fiber.

18. The simulated tissue structure of claim 14 wherein the at least one inclusion is embedded in or adhered to one of the first layer or the second layer.

19. The simulated tissue structure of claim 14 wherein the at least one inclusion is located between the third layer and the fourth layer such that the at least one inclusion is removable.

20. The simulated tissue structure of claim 14 wherein the at least one inclusion includes one or more of simulated anatomical structure, organ, vasculature, nerve, tissue, tumor, landmark, vein, vessel, and lumen.

* * * * *